US009201541B2

United States Patent
Kida et al.

(10) Patent No.: US 9,201,541 B2
(45) Date of Patent: Dec. 1, 2015

(54) DISPLAY DEVICE WITH TOUCH DETECTION FUNCTION AND ELECTRONIC APPARATUS

(71) Applicant: Japan Display Inc., Tokyo (JP)

(72) Inventors: Yoshitoshi Kida, Tokyo (JP); Koji Noguchi, Tokyo (JP); Yasuyuki Teranishi, Tokyo (JP); Hiroshi Mizuhashi, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 158 days.

(21) Appl. No.: 14/098,132

(22) Filed: Dec. 5, 2013

(65) Prior Publication Data

US 2014/0152616 A1 Jun. 5, 2014

(30) Foreign Application Priority Data

Dec. 5, 2012 (JP) .................................. 2012-266784
Dec. 5, 2013 (JP) .................................. 2013-251696

(51) Int. Cl.
G06F 3/044 (2006.01)
G06F 3/041 (2006.01)

(52) U.S. Cl.
CPC .............. *G06F 3/0418* (2013.01); *G06F 3/044* (2013.01)

(58) Field of Classification Search
CPC .... G06F 3/044; G06F 3/0412; G02F 1/13338
See application file for complete search history.

(56) References Cited

U.S. PATENT DOCUMENTS

| 2011/0267293 | A1 | 11/2011 | Noguchi et al. | |
|---|---|---|---|---|
| 2011/0267295 | A1* | 11/2011 | Noguchi et al. | 345/173 |
| 2011/0267296 | A1* | 11/2011 | Noguchi et al. | 345/173 |
| 2012/0044195 | A1* | 2/2012 | Nakanishi et al. | 345/174 |
| 2012/0050659 | A1 | 3/2012 | Nakanishi et al. | |
| 2012/0075238 | A1* | 3/2012 | Minami et al. | 345/174 |
| 2013/0093722 | A1* | 4/2013 | Noguchi et al. | 345/174 |
| 2013/0113735 | A1* | 5/2013 | Takeuchi et al. | 345/173 |
| 2014/0253485 | A1* | 9/2014 | Kida et al. | 345/173 |

FOREIGN PATENT DOCUMENTS

| JP | 2011-233018 | 11/2011 |
|---|---|---|
| JP | 2012-047807 | 3/2012 |
| KR | 10-2010-0127164 | 10/2009 |
| TW | 201222358 | 6/2012 |

OTHER PUBLICATIONS

Korean Office Action issued Apr. 30, 2015, for corresponding Korean Appln. No. 10-2013-148314 (7 pages).
Office Action issued in connection with Taiwanese Patent Application No. 102144684, dated Sep. 11, 2015. (18 pages).

\* cited by examiner

*Primary Examiner* — Ricardo L Osorio
(74) *Attorney, Agent, or Firm* — K&L Gates LLP

(57) ABSTRACT

According to an aspect, a display device with a touch detection function includes a plurality of drive electrodes that face a plurality of pixel electrodes in an orthogonal direction to the surface of the substrate, and extend in a direction parallel to the direction in which a plurality of signal lines extend. The display device with a touch detection function also includes a scan driving unit that applies a touch drive signal to a signal line that faces, in an overlapping manner in the orthogonal direction, a drive electrode to which the touch drive signal is applied.

9 Claims, 23 Drawing Sheets

UPPER HOUSING
551

552
LOWER HOUSING

552
LOWER HOUSING

551
UPPER HOUSING

LOWER HOUSING
552

CONNECTION UNIT
553

551
UPPER HOUSING

UPPER HOUSING
551

552
LOWER HOUSING

DISPLAY DEVICE WITH TOUCH DETECTION FUNCTION AND ELECTRONIC APPARATUS

CROSS REFERENCES TO RELATED APPLICATIONS

The present application claims priority to Japanese Priority Patent Application JP 2012-266784 filed in the Japan Patent Office on Dec. 5, 2012, and JP 2013-251696 filed in the Japan Patent Office on Dec. 5, 2013, the entire content of which is hereby incorporated by reference.

BACKGROUND

1. Technical Field

The present disclosure relates to a display device and an electronic apparatus that can detect an external proximity object, and particularly to a display device with a touch detection function and an electronic apparatus that can detect an external proximity object based on a change in an electrostatic capacitance.

2. Description of the Related Art

In recent years, touch detection devices commonly called touch panels that can detect an external proximity object have attracted attention. The touch panel is mounted on or integrated with a display device, such as a liquid-crystal display device, and used in a display device with a touch detection function. The display device with a touch detection function displays various button images, etc. on the display device so as to allow information input by using the touch panel as a substitute for ordinary mechanical buttons. The display device with a touch detection function having the touch panel as described above does not need input devices, such as a keyboard, a mouse, and a keypad, and thus tends to be more widely used also in a computer, a portable information apparatus, such as a mobile phone, and so on.

Several types of the touch detection device exist, such as an optical type, a resistance type, and an electrostatic capacitance type. When the electrostatic capacitance type touch detection device is used for a portable electronic apparatus, devices having a relatively simple structure and low power consumption can be provided. For example, Japanese Patent Application Laid-open Publication No. 2011-233018 (JP-A-2011-233018) and Japanese Patent Application Laid-open Publication No. 2012-047807 (JP-A-2012-047807) disclose electrostatic capacitance type touch panels.

To obtain a larger screen size or a higher definition of the display device with a touch detection function, the frequency of drive signals supplied to drive electrodes needs to be increased. In the display device with a touch detection function, pixel signals for displaying an image are also supplied to pixel electrodes of a plurality of signal lines. Requirements for a thinner display device with a touch detection function in recent years have reduced the distance between the drive electrode and the signal line. When the drive electrode and the signal line three-dimensionally cross each other, a larger parasitic capacitance is produced between the drive electrode and the signal line, so that charging and discharging the drive electrode takes a longer time.

The above-mentioned display device with a touch detection function disclosed in each of JP-A-2011-233018 and JP-A-2012-047807 does not take into consideration the increase in the parasitic capacitance between the drive electrode and the signal line.

For the foregoing reasons, there is a need for a display device with a touch detection function and an electronic apparatus that can perform touch detection while suppressing the influence of the parasitic capacitance between the drive electrode and the signal line.

SUMMARY

According to an aspect, a display device with a touch detection function includes a substrate; a plurality of pixel electrodes that are arranged in rows and columns in a plane parallel to the substrate; a plurality of signal lines that extend in a plane parallel to a surface of the substrate, and supply pixel signals for displaying an image on the plurality of pixel electrodes; a display function layer that exerts an image display function based on the pixel signals; a plurality of drive electrodes that face the plurality of pixel electrodes in an orthogonal direction to the surface of the substrate, and extend in a direction parallel to the direction in which a plurality of signal lines extend; a plurality of touch detection electrodes that face the plurality of drive electrodes in the orthogonal direction, extend in a direction different from the direction in which the plurality of signal lines extend, and capacitively couple with the plurality of drive electrodes; and a scan driving unit that scans the plurality of drive electrodes, and applies thereto a touch drive signal for touch detection. The scan driving unit applies the touch drive signal to a signal line faces, in an overlapping manner in the orthogonal direction, a drive electrode to which the touch drive signal is applied.

According to another aspect, an electronic apparatus comprising a display device with a touch detection function capable of detecting an external proximity object. The display device with a touch detection function includes a substrate; a plurality of pixel electrodes that are arranged in rows and columns in a plane parallel to the substrate; a plurality of signal lines that extend in a plane parallel to a surface of the substrate, and supply pixel signals for displaying an image on the plurality of pixel electrodes; a display function layer that exerts an image display function based on the pixel signals; a plurality of drive electrodes that face the plurality of pixel electrodes in an orthogonal direction to the surface of the substrate, and extend in a direction parallel to the direction in which the signal lines extend; a plurality of touch detection electrodes that face the plurality of drive electrodes in the orthogonal direction, extend in a direction different from the direction in which the plurality of signal lines extend, and capacitively couple with the plurality of drive electrodes; and a scan driving unit that scans the plurality of drive electrodes, and applies thereto a touch drive signal for touch detection. The scan driving unit applies the touch drive signal for touch detection to a signal line faces, in an overlapping manner in the orthogonal direction, a drive electrode to which the touch drive signal is applied.

Additional features and advantages are described herein, and will be apparent from the following Detailed Description and the figures.

DETAILED DESCRIPTION

Embodiments for practicing the present disclosure will be described in detail with reference to the drawings. The description of the embodiments below will not limit the present disclosure. The constituent elements described below include elements easily envisaged by those skilled in the art and substantially identical elements. The constituent elements described below can also be combined as appropriate. The description will be made in the following order.

1. Embodiments (display device with touch detection function)
   1-1. First embodiment
   1-2. Second embodiment
   1-3. Third embodiment
   1-4. Fourth embodiment
   1-5. Other embodiments and modifications
2. Application examples (electronic apparatuses)
Examples in which a display device with a touch detection function according to the embodiments mentioned above is applied to an electronic apparatus
3. Aspects of present disclosure

1. EMBODIMENTS

1-1. First Embodiment

1-1A. Configuration Examples

Overall Configuration Example

Figure 1:
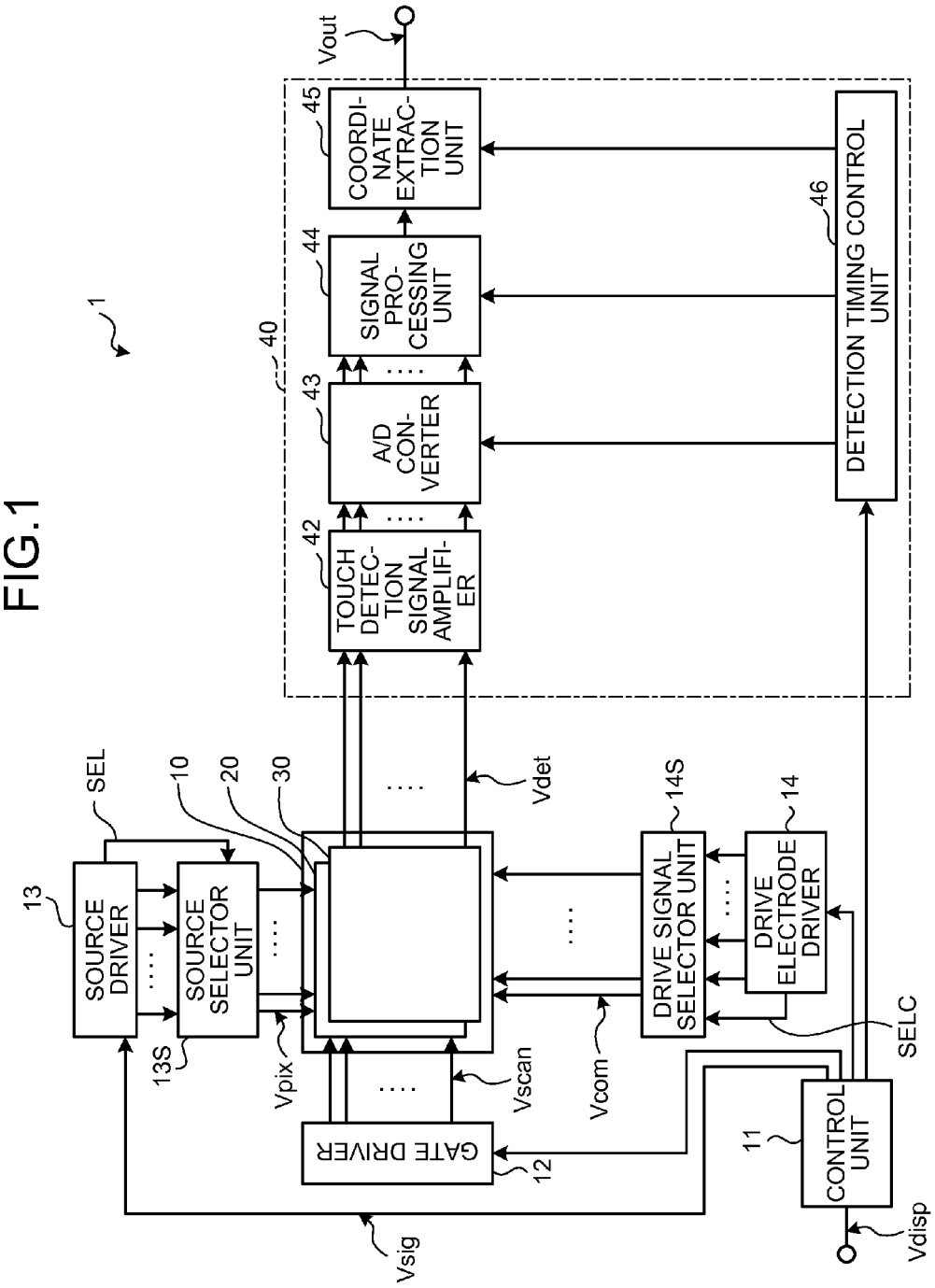
FIG. 1 is a block diagram illustrating a configuration example of a display device with a touch detection function according to a first embodiment of the present disclosure.

FIG. 1 is a block diagram illustrating a configuration example of a display device with a touch detection function according to a first embodiment of the present disclosure. This display device with a touch detection function 1 includes a display unit with a touch detection function 10, a control unit 11, a gate driver 12, a source driver 13, a source selector unit 13S, a drive electrode driver 14, a drive signal selector unit 14S, and a touch detection unit 40. The display device with a touch detection function 1 is a display device in which the display unit with a touch detection function 10 has a built-in touch detection function. The display unit with a touch detection function 10 is what is called an in-cell type device obtained by integrating a liquid-crystal display unit 20 using liquid-crystal display elements as display elements with an electrostatic capacitance type touch detection device 30. The displaying device with a touch detection function 10 may be what is called an on-cell type device obtained by mounting the electrostatic capacitance type touch detection device 30 on the liquid-crystal display unit 20 using the liquid-crystal display elements as the display elements.

The liquid-crystal display unit 20 is a device that performs display by sequentially scanning one horizontal line at a time according to a scan signal Vscan supplied from the gate driver 12, as will be described later. The control unit 11 is a circuit that supplies, based on a video signal Vdisp supplied from the outside, control signals to each of the gate driver 12, the source driver 13, the drive electrode driver 14, and the touch detection unit 40, and thus controls them so as to operate in synchronization with each other.

The gate driver 12 has a function to sequentially select one horizontal line to be display-driven by the display unit with a touch detection function 10 based on the control signal supplied from the control unit 11.

The source driver 13 is a circuit that supplies pixel signals Vpix to respective pixels Pix (sub-pixels SPix), which will be described later, of the display unit with a touch detection function 10 based on the control signal supplied from the control unit 11. The source driver 13 generates pixel signals obtained by time-division multiplexing the pixel signals Vpix of the sub-pixels SPix of the liquid-crystal display unit 20 from a video signal for one horizontal line, and supplies the generated pixel signals to the source selector unit 13S, as will be described later. The source driver 13 also generates a switch control signal SEL necessary for separating the pixel signals Vpix multiplexed into an image signal Vsig, and supplies the switch control signal SEL together with the pixel signals Vpix to the source selector unit 13S. The source selector unit 13S can reduce the number of wirings between the source driver 13 and the gate driver 12.

The drive electrode driver 14 is a circuit that supplies drive signals Vcom to drive electrodes COML, which will be described later, of the display unit with a touch detection function 10 based on the control signal supplied from the control unit 11. The drive signal selector unit 14S selects the drive electrode COML to which the drive signal Vcom is to be supplied according to a switch control signal SELC generated by the drive electrode driver 14, which will be described later.

The touch detection unit 40 is a circuit that detects existence or non-existence of a touch on (above-mentioned contact state with) the touch detection device 30 based on the control signal supplied from the control unit 11 and touch detection signals Vdet supplied from the touch detection device 30 of the display unit with a touch detection function 10. If the touch detection unit 40 detects the existence of the touch, the touch detection unit 40 obtains, for example, coordinates of the touch in a touch detection region. The touch detection unit 40 includes a touch detection signal amplifier 42, an A/D converter 43, a signal processing unit 44, a coordinate extraction unit 45, and a detection timing control unit 46.

The touch detection signal amplifier 42 amplifies the touch detection signals Vdet supplied from the touch detection device 30. The touch detection signal amplifier 42 may include a low-pass analog filter that removes high-frequency components (noise components) included in the touch detection signals Vdet to extract touch components and outputs each of them.

Basic Principle of Touch Detection of Electrostatic Capacitance Type

Figure 2:
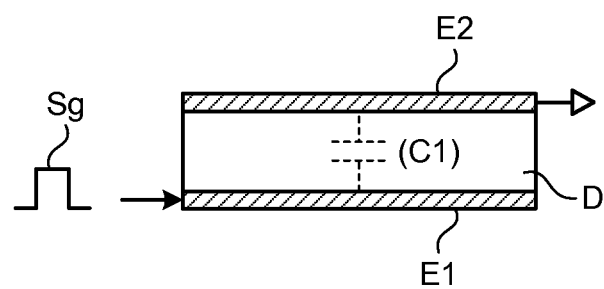
FIG. 2 is an explanatory diagram illustrating a state in which a finger is neither in contact with nor in proximity to a device for explaining a basic principle of touch detection method of an electrostatic capacitance type.
Figure 3:
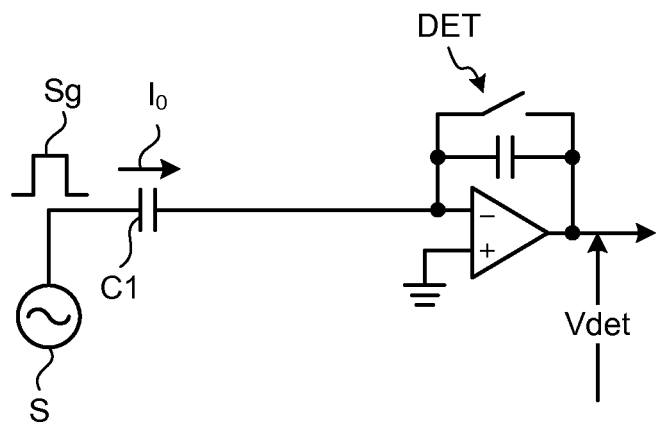
FIG. 3 is an explanatory diagram illustrating an example of an equivalent circuit in the state illustrated in FIG. 2 in which the finger is neither in contact with nor in proximity to a device.
Figure 4:
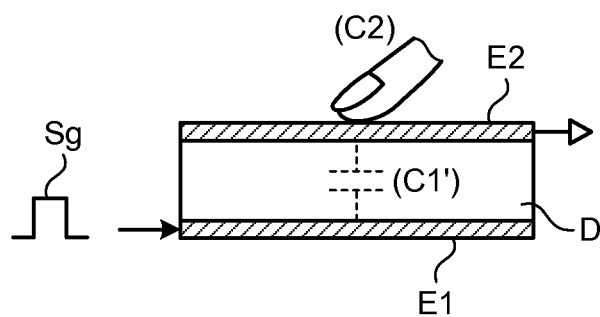
FIG. 4 is an explanatory diagram illustrating a state in which the finger is in contact with or in proximity to a device for explaining the basic principle of touch detection method of the electrostatic capacitance type.
Figure 5:
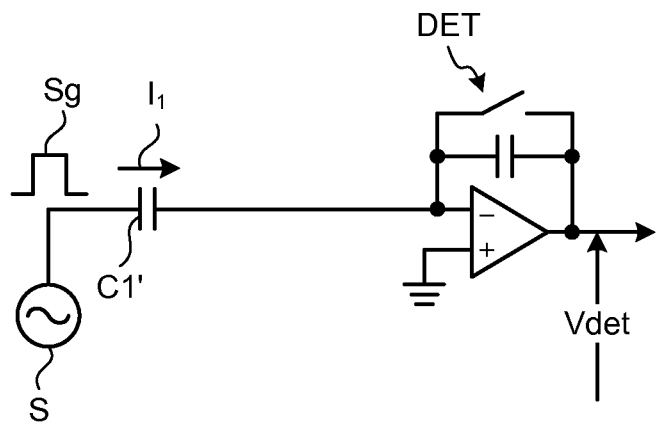
FIG. 5 is an explanatory diagram illustrating an example of the equivalent circuit in the state illustrated in FIG. 4 in which the finger is in contact with or in proximity to a device.

The touch detection device 30 operates based on a basic principle of touch detection of electrostatic capacitance type, and outputs the touch detection signals Vdet. A description will be made of the basic principle of the touch detection in the display device with a touch detection function 1 of the embodiment with reference to FIGS. 1 to 6. FIG. 2 is an explanatory diagram illustrating a state in which a finger is neither in contact with nor in proximity to a device for explaining the basic principle of touch detection method of the electrostatic capacitance type. FIG. 3 is an explanatory diagram illustrating an example of an equivalent circuit in the state illustrated in FIG. 2 in which the finger is neither in contact with nor in proximity to a device. FIG. 4 is an explanatory diagram illustrating a state in which the finger is in contact with or in proximity to a device for explaining the basic principle of touch detection method of the electrostatic capacitance type. FIG. 5 is an explanatory diagram illustrating an example of the equivalent circuit in the state illustrated in FIG. 4 in which the finger is in contact with or in proximity to a device.

For example, as illustrated in FIG. 2, a capacitive element C1 includes a pair of electrodes, that is, a drive electrode E1 and a touch detection electrode E2 that are arranged opposite to each other with a dielectric body D interposed therebetween. As illustrated in FIG. 3, one end of the capacitive element C1 is coupled to an alternating signal source (drive signal source) S, and the other end thereof is coupled to a voltage detector (touch detection unit) DET. The voltage detector DET is, for example, an integration circuit included in the touch detection signal amplifier 42 illustrated in FIG. 1.

Applying an alternating-current rectangular wave Sg having a predetermined frequency (such as approximately several kilohertz to several hundred kilohertz) from the alternating signal source S to the drive electrode E1 (one end of the capacitive element C1) causes an output waveform (touch detection signal Vdet) to occur via the voltage detector DET coupled to the side of the touch detection electrode E2 (the other end of the capacitive element C1). The alternating-current rectangular wave Sg corresponds to a touch drive signal Vcomt, which will be described later.

Figure 6:
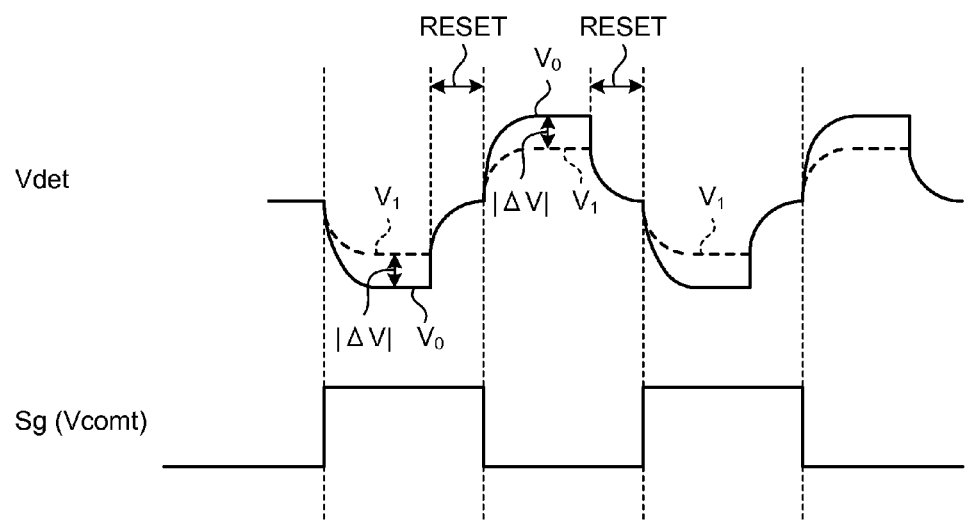
FIG. 6 is a diagram illustrating an example of waveforms of a drive signal and a touch detection signal.

In a state (non-contact state) in which the finger is not in contact with (nor in proximity to) a device, a current $I_0$ according to the capacitance value of the capacitive element C1 flows in association with the charge and discharge of the capacitive element C1, as illustrated in FIGS. 2 and 3. As illustrated in FIG. 6, the voltage detector DET converts a variation in the current $I_0$ according to the alternating-current rectangular wave Sg into a variation in a voltage (waveform $V_0$ of a solid line).

In a state (contact state) in which the finger is in contact with (or in proximity to) a device, an electrostatic capacitance C2 produced by the finger is in contact with or in proximity to the touch detection electrode E2, as illustrated in FIG. 4. Thus, a fringe component of the electrostatic capacitance existing between the drive electrode E1 and the touch detection electrode E2 is interrupted, and the electrostatic capacitance acts as a capacitive element C1' having a smaller capacitance value than that of the capacitive element C1. Referring to the equivalent circuit illustrated in FIG. 5, a current $I_1$ flows in the capacitive element C1'. As illustrated in FIG. 6, the voltage detector DET converts a variation in the current $I_1$ according to the alternating-current rectangular wave Sg into a variation in a voltage (waveform $V_1$ of a dotted line). In this case, the waveform $V_1$ has a smaller amplitude than that of the above-mentioned waveform $V_0$. This shows that an absolute value $|\Delta V|$ of a voltage difference between the waveform $V_0$ and the waveform $V_1$ changes according to an influence of an object, such as a finger, approaching from the outside. To accurately detect the absolute value $|\Delta V|$ of the voltage difference between the waveform $V_0$ and the waveform $V_1$, the voltage detector DET preferably performs an operation including a period RESET during which the charge or discharge of the capacitor is reset by switching in the circuit in accordance with the frequency of the alternating-current rectangular wave Sg.

The touch detection device 30 illustrated in FIG. 1 is configured to perform the touch detection by sequentially scanning one detection block at a time according to the drive signals Vcom (touch drive signals Vcomt to be described later) supplied from the drive electrode driver 14.

The touch detection device 30 is configured to output the touch detection signals Vdet from a plurality of touch detection electrodes TDL (to be described later) via the voltage detectors DET illustrated in FIG. 3 or 5 on a detection block by detection block basis, and supply the touch detection signals Vdet to the touch detection signal amplifier 42 of the touch detection unit 40.

The A/D converter 43 is a circuit that samples each analog signal output from the touch detection signal amplifier 42 at a time synchronized with the touch drive signal Vcomt, and converts it into a digital signal.

The signal processing unit 44 includes a digital filter that reduces frequency components (noise components) included in the output signals of the A/D converter 43 other than those of the frequency at which the touch drive signals Vcomt have been sampled. The signal processing unit 44 is a logic circuit that detects existence or non-existence of a touch on the touch detection device 30 based on the output signals of the A/D converter 43. The signal processing unit 44 performs processing to extract only a voltage difference by the finger. The voltage difference by the finger is the absolute value $|\Delta V|$ of the difference between the waveform $V_0$ and the waveform $V_1$ described above. The signal processing unit 44 may perform a calculation of averaging the absolute values $|\Delta V|$ for one detection block to obtain an average value of the absolute values $|\Delta V|$. This allows the signal processing unit 44 to reduce the influence of the noise. The signal processing unit 44 compares the detected voltage difference by the finger with a predetermined threshold voltage, and if the detected voltage difference is the threshold voltage or more, determines that the state is the contact state of the external proximity object approaching from the outside. If the detected voltage difference is less than the threshold voltage, the signal processing unit 44 determines that the state is the non-contact state of the external proximity object. The signal processing unit 44 can perform the touch detection in this manner.

The coordinate extraction unit 45 is a logic circuit that obtains touch panel coordinates of a touch when the touch is detected in the signal processing unit 44. The detection timing control unit 46 performs control so as to operate the A/D converter 43, the signal processing unit 44, and the coordinate extraction unit 45 in synchronization with each other. The coordinate extraction unit 45 outputs the touch panel coordinates as a signal output Vout.

Module

Figure 7:
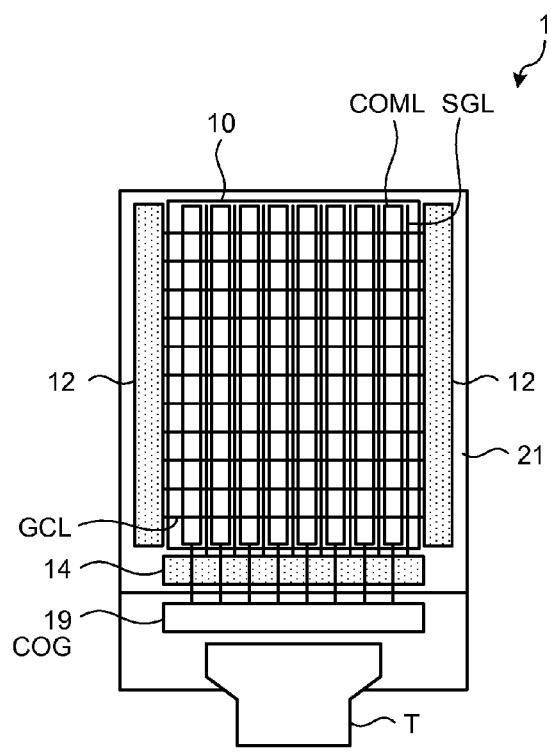
FIG. 7 is a diagram illustrating an example of a module implemented with the display device with a touch detection function according to the first embodiment.

FIG. 7 is a diagram illustrating an example of a module implemented with the display device with a touch detection function according to the first embodiment. As illustrated in FIG. 7, the display device with a touch detection function 1 includes the display unit with a touch detection function 10, the drive electrode driver 14, and a chip on glass (COG) 19. The COG 19 includes the source driver 13 and the source selector unit 13S described above. The drive signal selector unit 14S (not illustrated) is arranged in the same position as that of the drive electrode driver 14. The drive electrode driver 14 is formed on a TFT substrate 21 that is a glass substrate. The COG 19 is a chip mounted on the TFT substrate 21, and has built-in circuits, such as the control unit 11 and the source driver 13 illustrated in FIG. 1, necessary for display operations. The COG of the display device with a touch detection function 1 may have built-in circuits, such as the drive electrode driver 14 and the gate driver 12.

FIG. 7 schematically illustrates, in a direction orthogonal to a surface of the TFT substrate 21, the display unit with a touch detection function 10 having the drive electrodes COML and scan signal lines GCL that are formed so as to three-dimensionally intersect the drive electrodes COML and are coupled to the gate driver 12. FIG. 7 also schematically illustrates, in the direction orthogonal to the surface of the TFT substrate 21, the display unit with a touch detection function 10 having the drive electrodes COML, and the pixel signal lines SGL that are formed so as to extend in a direction not intersecting but parallel to the drive electrodes COML.

The display unit with a touch detection function 10 is a device commonly called landscape type (horizontally long). The drive electrodes COML are formed in the long side direction of the display unit with a touch detection function 10. The touch detection electrodes TDL, which will be described later, are formed in the short side direction of the display unit with a touch detection function 10. The output of the touch detection electrodes TDL is coupled to the touch detection unit 40 (not illustrated) mounted outside this module via a terminal unit T that is provided on the short side of the display unit with a touch detection function 10 and is composed of a flexible substrate, etc.

In this manner, in the display device with a touch detection function 1 illustrated in FIG. 7, the touch detection signals Vdet is output from the short side of the display unit with a touch detection function 10. This facilitates routing of wiring when coupling is made to the touch detection unit 40 via the terminal unit T in the display device with a touch detection function 1.

Display Unit with Touch Detection Function 10

Figure 8:
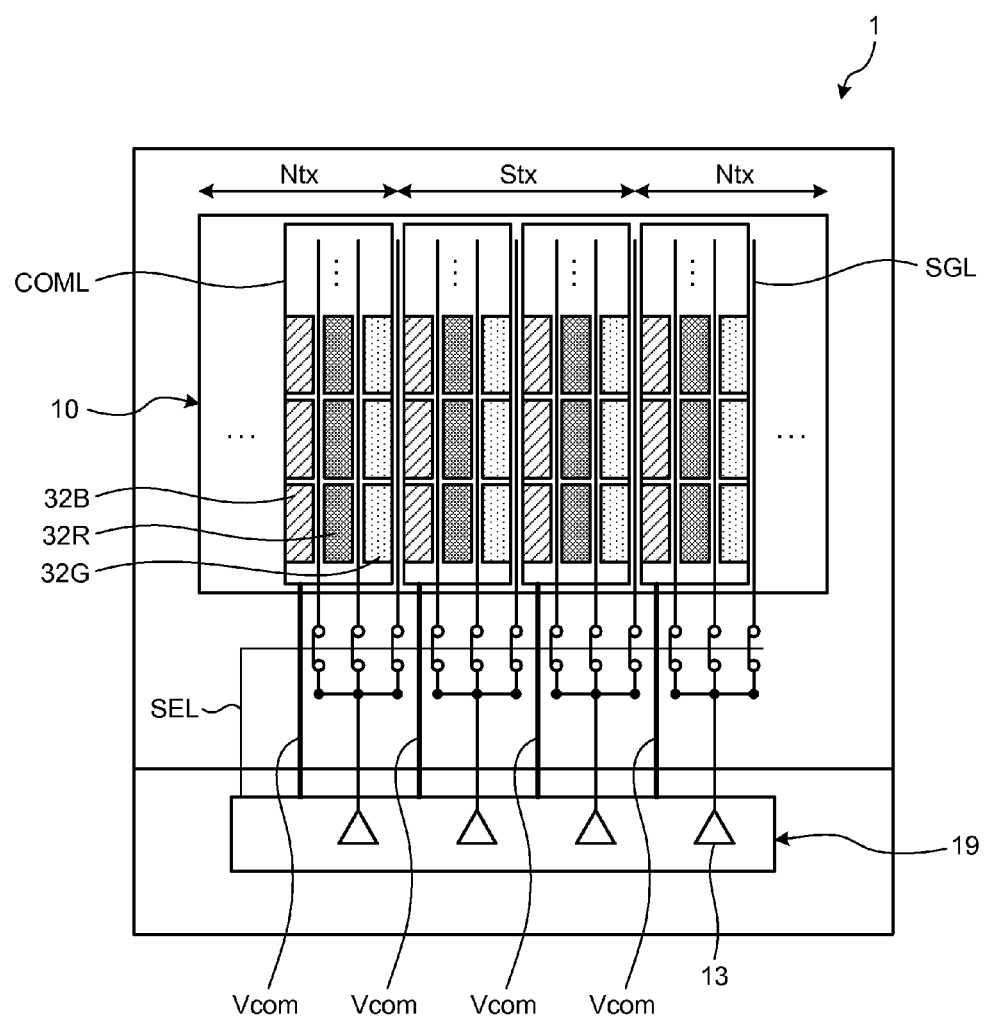
FIG. 8 is a schematic diagram explaining a relation between drive electrodes and pixel signal lines in the module implemented with the display device with a touch detection function according to the first embodiment.
Figure 9:
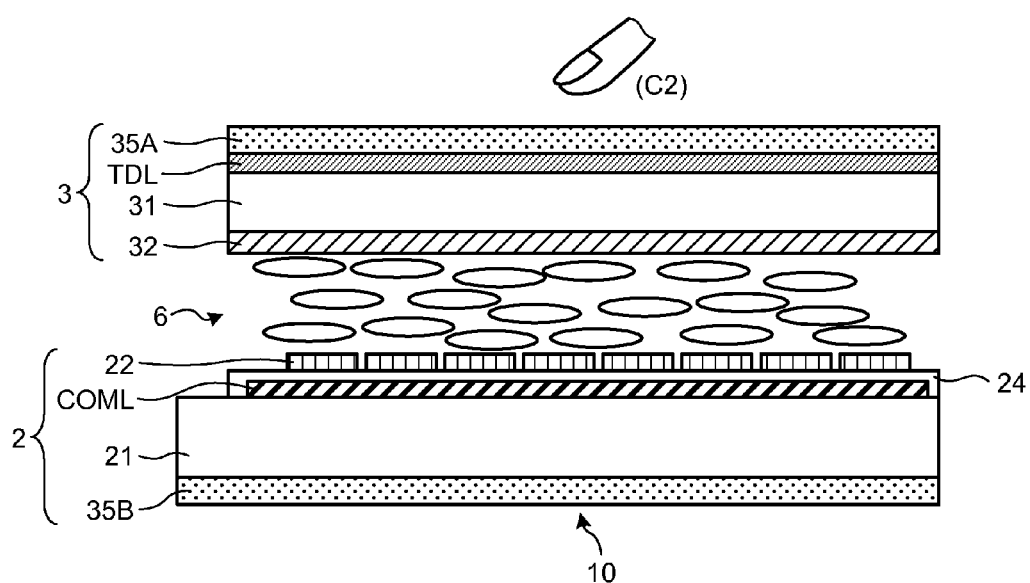
FIG. 9 is a cross-sectional view illustrating a schematic cross-sectional structure of a display unit with a touch detection function according to the first embodiment.
Figure 10:
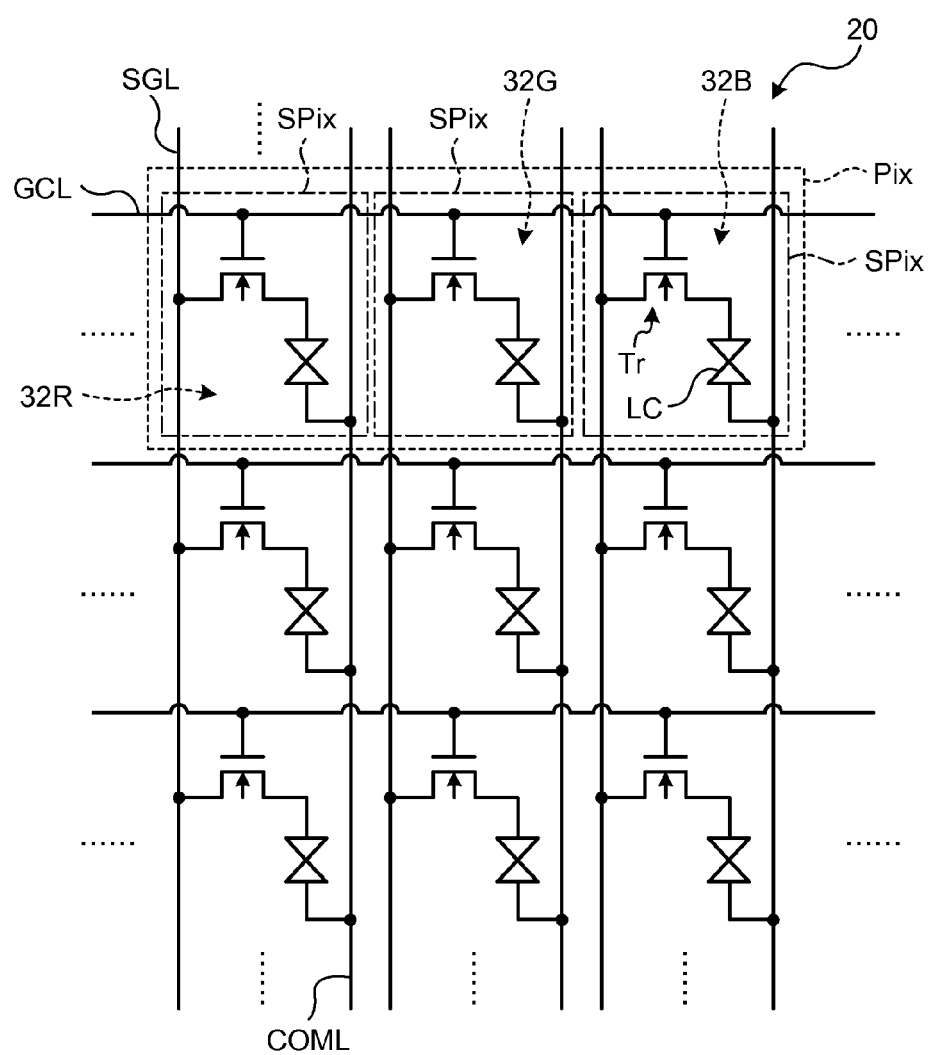
FIG. 10 is a circuit diagram illustrating a pixel array of the display unit with a touch detection function according to the first embodiment.

A configuration example of the display unit with a touch detection function 10 will then be described in detail. FIG. 8 is a schematic diagram explaining a relation between the drive electrodes and pixel signal lines in the module implemented with the display device with a touch detection function according to the first embodiment. FIG. 9 is a cross-sectional view illustrating a schematic cross-sectional structure of the display unit with a touch detection function according to the first embodiment. FIG. 10 is a circuit diagram illustrating a pixel array of the display unit with a touch detection function according to the first embodiment.

As illustrated in FIG. 8, in the display device with a touch detection function 1, pixel signal lines SGL are coupled via the source selector unit 13S to the source driver 13 built into the COG 19. The source selector unit 13S performs on/off operations according to the switch control signal SEL. In the display device with a touch detection function 1, the drive electrodes COML are coupled to the drive electrode driver 14 built into the COG 19. A color filter 32 includes color regions 32R, 32G, and 32B colored in three colors of red (R), green (G), and blue (B). The color filter 32 faces the drive electrodes COML in the direction orthogonal to the TFT substrate 21, and overlaps the drive electrodes COML when viewed in the direction orthogonal to the surface of the TFT substrate 21.

The drive electrode driver 14, for example, supplies the drive signals Vcom only to a selected drive electrode block Stx, and does not supply the drive signals Vcom to drive electrode blocks Ntx that are not selected.

As illustrated in FIG. 9, the display unit with a touch detection function 10 includes a pixel substrate 2, a counter substrate 3 arranged facing a surface of the pixel substrate 2 in the direction orthogonal thereto, and a liquid crystal layer 6 inserted between the pixel substrate 2 and the counter substrate 3.

The liquid crystal layer 6 modulates light passing therethrough according to the state of an electric field, and uses a liquid-crystal display unit using liquid crystals of a horizontal electric field mode, such as a fringe field switching (FFS) mode or an in-plane switching (IPS) mode. An orientation film may be interposed between the liquid crystal layer 6 and the pixel substrate 2, and between the liquid crystal layer 6 and the counter substrate 3, which are illustrated in FIG. 9.

The counter substrate 3 includes a glass substrate 31 and the color filter 32 formed on one surface of the glass substrate 31. The touch detection electrodes TDL serving as detection electrodes of the touch detection device 30 are formed on the other surface of the glass substrate 31, and a polarizing plate 35A is further disposed on top of the touch detection electrodes TDL.

The pixel substrate 2 includes the TFT substrate 21 as a circuit substrate, a plurality of pixel electrodes 22 arranged in a matrix on top of the TFT substrate 21, the drive electrodes COML formed between the TFT substrate 21 and the pixel electrodes 22, an insulation layer 24 insulating the pixel electrodes 22 from the drive electrodes COML, and an incident-side polarizing plate 35B on the lower surface of the TFT substrate 21.

The TFT substrate 21 is formed with wiring illustrated in FIG. 10, including thin-film transistor (TFT) elements Tr of the respective sub-pixels SPix, the pixel signal lines SGL that supply the pixel signals Vpix to the respective pixel electrodes 22, and the scan signal lines GCL that drive the respective TFT elements Tr. In this manner, the pixel signal lines SGL extend in a plane parallel to the surface of the TFT substrate 21, and supply the pixel signals Vpix for displaying an image on the pixels. The liquid-crystal display unit 20 illustrated in FIG. 10 includes the sub-pixels SPix arranged in a matrix. The sub-pixels SPix each include the TFT element Tr and a liquid crystal element LC. The TFT element Tr is constituted by a thin-film transistor, and in the present example, constituted by an n-channel metal oxide semiconductor (MOS) type TFT. A source of the TFT element Tr is coupled to the pixel signal line SGL; a gate thereof is coupled to the scan signal line GCL; and a drain thereof is coupled to one end of the liquid crystal element LC. One end of the liquid crystal element LC is coupled to the drain of the TFT element Tr, and the other end thereof is coupled to the drive electrode COML.

The sub-pixel SPix is interconnected by the scan signal line GCL with another sub-pixel SPix belonging to the same row of the liquid-crystal display unit 20. The scan signal line GCL is coupled to the gate driver 12, and is supplied with the scan signal Vscan from the gate driver 12. The sub-pixel SPix is interconnected by the pixel signal line SGL with another sub-pixel SPix belonging to the same column of the liquid-crystal display unit 20. The pixel signal line SGL is coupled to the source driver 13, and is supplied with the pixel signal Vpix from the source driver 13. The sub-pixel SPix is further interconnected by the drive electrode COML with another sub-pixel SPix belonging to the same column of the liquid-crystal display unit 20. The drive electrode COML is coupled to the drive electrode driver 14, and is supplied with the drive signal Vcom from the drive electrode driver 14. This means that the sub-pixels SPix belonging to the same one of the columns share one of the drive electrodes COML, in the present example.

The gate driver 12 illustrated in FIG. 1 applies the scan signals Vscan to the gates of the TFT elements Tr of the sub-pixels SPix via the scan signal line GCL illustrated in FIG. 10 so as to sequentially select, as a target of display driving, one row (one horizontal line) of the sub-pixels SPix formed in a matrix on the liquid-crystal display unit 20. The source driver 13 illustrated in FIG. 1 supplies the pixel signals Vpix to the respective sub-pixels SPix constituting the horizontal line sequentially selected by the gate driver 12 via the pixel signal lines SGL illustrated in FIG. 10. The sub-pixels SPix are configured to display the horizontal line according to the pixel signals Vpix thus supplied. The drive electrode driver 14 illustrated in FIG. 1 applies the drive signals Vcom to the drive electrodes COML in each drive electrode block consisting of a predetermined number of the drive electrodes COML illustrated in FIGS. 9 and 10, and thus drives the drive electrodes COML on a block by block basis.

As describe above, the gate driver 12 sequentially selects the horizontal line on the liquid-crystal display unit 20 by driving the scan signal line GCL so as to perform line-sequential scanning in a time-division manner. The source driver 13 supplies the pixel signals Vpix to the sub-pixels SPix belonging to one horizontal line so as to perform the display on the liquid-crystal display unit 20 on a horizontal line by horizontal line basis. The drive electrode driver 14 is configured to apply the drive signals Vcom to the drive electrode block including the drive electrodes COML corresponding to the horizontal line while this display operation is performed, In the color filter 32 illustrated in FIG. 9, for example, the color regions colored in the three colors of red (R), green (G), and blue (B) are periodically arranged, and one set of the color regions 32R, 32G, and 32B (refer to FIG. 8) of the three colors of R, G, and B is associated, as the pixel Pix, with the sub-pixels SPix illustrated in FIG. 10 mentioned above. The color filter 32 faces the liquid crystal layer 6 in the direction orthogonal to the TFT substrate 21. The color filter 32 may have a combination of other colors as long as being colored in different colors from each other.

Figure 11:
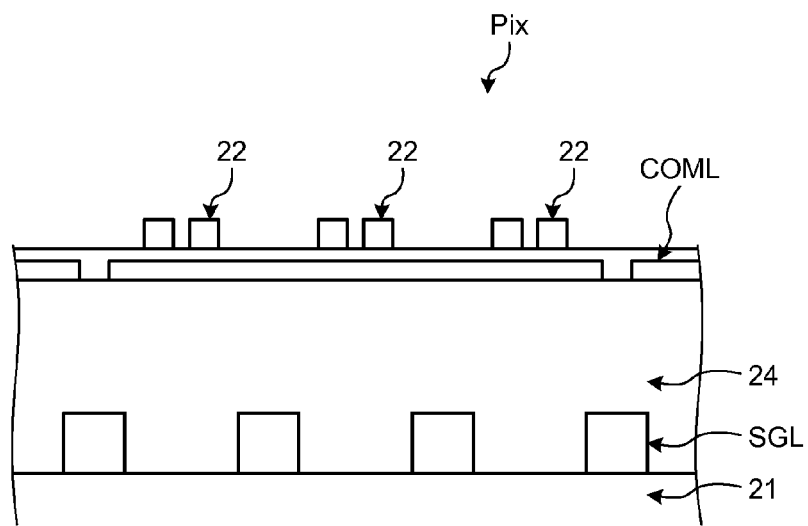
FIG. 11 is a schematic diagram of a cross section, explaining a relation among the drive electrodes, the pixel signal lines, and pixel electrodes in the module implemented with the display device with a touch detection function according to the first embodiment.
Figure 12:
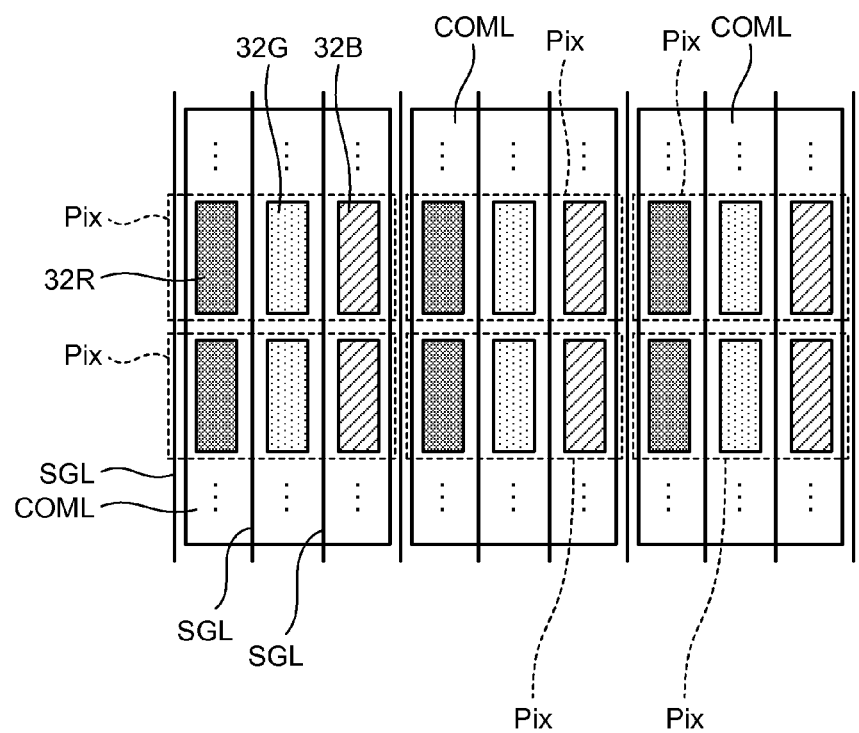
FIG. 12 is a schematic diagram explaining a relation among the drive electrodes, the pixel signal lines, and pixels in the module implemented with the display device with a touch detection function according to the first embodiment.
Figure 13:
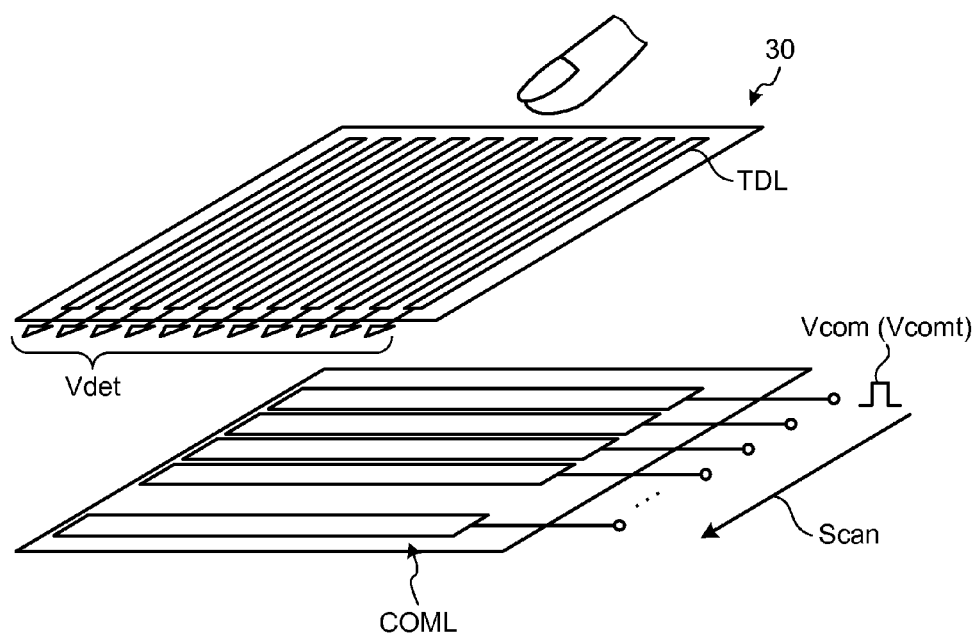
FIG. 13 is a perspective view illustrating a configuration example of the drive electrodes and touch detection electrodes of the display unit with a touch detection function according to the first embodiment.

The drive electrode COML according to the embodiment functions as a drive electrode of the liquid-crystal display unit 20, and also as a drive electrode of the touch detection device 30. FIG. 11 is a schematic diagram of a cross section, explaining a relation among the drive electrodes, the pixel signal lines, and pixel electrodes in the module implemented with the display device with a touch detection function according to the first embodiment. FIG. 12 is a schematic diagram explaining a relation among the drive electrodes, the pixel signal lines, and the pixels in the module implemented with the display device with a touch detection function according to the first embodiment. FIG. 13 is a perspective view illustrating a configuration example of the drive electrodes and the touch detection electrodes of the display unit with a touch detection function according to the first embodiment. As illustrated in FIG. 11, the drive electrodes COML face the pixel electrodes 22 in the direction orthogonal to the surface of the TFT substrate 21. As illustrated in FIGS. 11 and 12, each one of the drive electrodes COML is arranged so as to correspond to three of the pixel electrodes 22 (pixel electrodes 22 constituting three columns). The insulation layer 24 insulates the pixel electrodes 22 from the drive electrodes COML, and the pixel electrodes 22 from the pixel signal lines SGL formed on the surface of the TFT substrate 21.

As illustrated in FIG. 12, the drive electrodes COML extend in a direction parallel to the direction of extension of the pixel signal lines SGL described above. The drive electrodes COML are configured such that the drive signals Vcom having an alternating-current rectangular waveform are applied from the drive electrode driver 14 to the drive electrodes COML via contact conductive columns (not illustrated) having electrical conductivity. The color regions 32R, 32G, and 32B of the three colors of R, G, and B are assigned to the sub-pixels SPix of the pixel Pix illustrated in FIG. 10 mentioned above. As illustrated in FIG. 12, a gap between the adjacent drive electrodes COML is positioned between the adjacent pixels Pix. In this manner, the drive electrodes COML extend in parallel with each other for each of the pixels Pix consisting of a set of the red color region 32R of red (R), the green color region 32G of green (G), and the blue color region 32B of blue (B) of the color filter 32. This arranges the gaps between the adjacent drive electrodes COML periodically on a pixel Pix by pixel Pix basis, thereby reducing the possibility that a person notices stripes associated with the gaps between the adjacent drive electrodes COML.

In the color filter 32, the brightness of the color region 32G of green (G) is generally higher than those of the color region 32R of red (R) and the color region 32B of blue (B). The drive electrodes COML are transparent electrodes made of transparent conductive material (transparent conductive oxide) such as indium tin oxide (ITO). While the drive electrodes COML are transparent, the gaps between the adjacent drive electrodes COML are likely to be noticed as stripes by human eyes. For this reason, in the display device with a touch detection function 1 according to the first embodiment, the gap between the adjacent drive electrodes COML is positioned between the color region 32R of red (R) and the color region 32B of blue (B) whose brightnesses are relatively low. This arranges the gaps between the adjacent drive electrodes COML periodically on a pixel Pix by pixel Pix basis, thereby reducing the possibility that a person notices the stripes associated with the gaps between the adjacent drive electrodes COML. In addition, the display device with a touch detection function 1 according to the first embodiment maintains an aperture ratio of the color region 32G of green (G) having a higher brightness than those of the color region 32R of red (R) and the color region 32B of blue (B).

Figure 14:
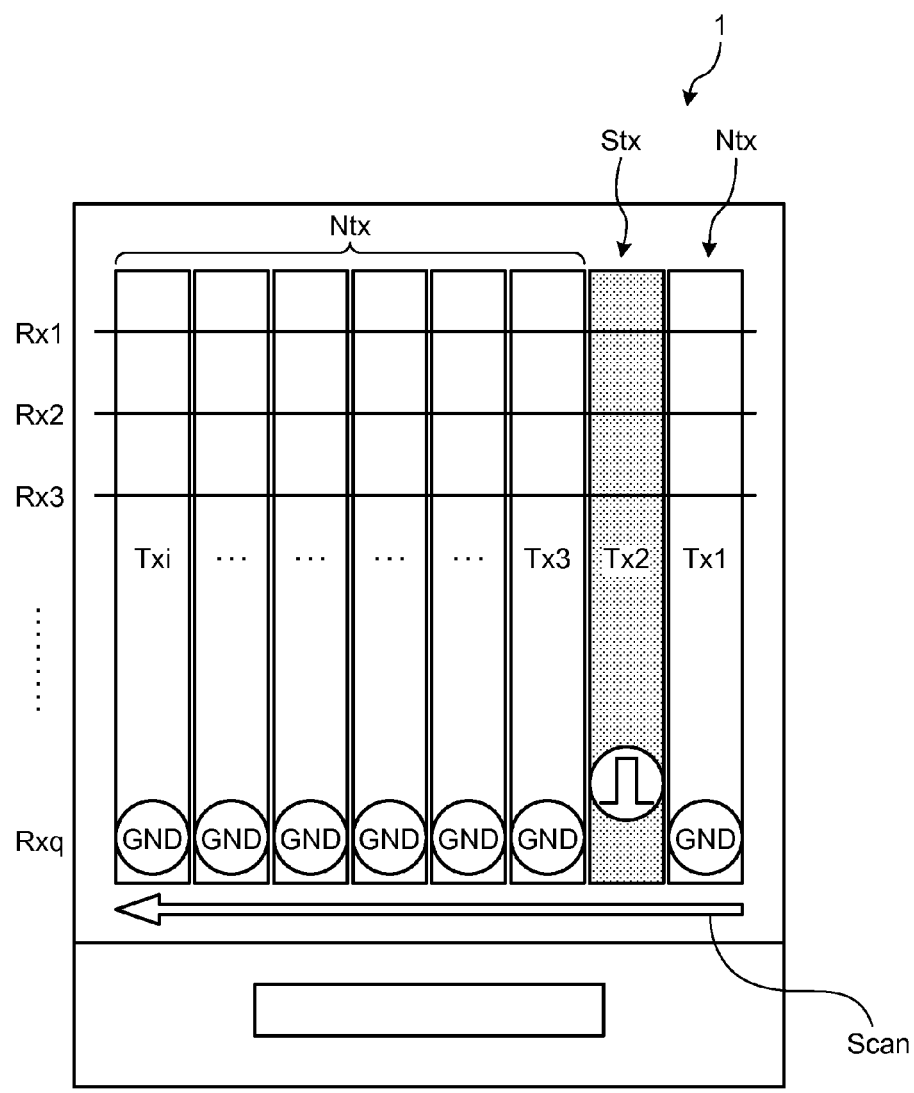
FIG. 14 is a schematic diagram illustrating an operation example of a drive electrode driver according to the first embodiment.

FIG. 13 illustrates in a perspective manner the configuration example of the touch detection device 30. FIG. 14 is a schematic diagram illustrating an operation example of the drive electrode driver according to the first embodiment. The touch detection device 30 is composed of the drive electrodes COML and the touch detection electrodes TDL. The drive electrodes COML are composed of a plurality of stripe-like electrode patterns extending in one direction. When a touch detection operation is performed, the drive electrode driver 14 is configured to sequentially supply the drive signals Vcom to the respective electrode patterns, and thus to perform a line-sequential scan drive in a time-division manner, as will be described later. The touch detection electrodes TDL are composed of stripe-like electrode patterns extending in the direction intersecting the extending direction of the electrode patterns of the drive electrodes COML. The touch detection electrodes TDL face the drive electrodes COML in the direction orthogonal to the surface of the TFT substrate 21. Each of the electrode patterns of the touch detection electrodes TDL is coupled to an input of the touch detection signal amplifier 42 of the touch detection unit 40. The electrode patterns intersecting each other provided by the drive electrodes COML and the touch detection electrodes TDL generate electrostatic capacitances at intersecting portions therebetween.

When the touch detection device 30 performs the touch detection operation, this configuration causes the drive electrode driver 14 to drive the drive electrodes COML so as to sequentially scan the drive electrode blocks in a time-division manner. This leads to sequential selection of one detection block of the drive electrodes COML in the scan direction Scan, and causes the touch detection device 30 to output the touch detection signals Vdet from the touch detection electrodes TDL. The touch detection device 30 is configured to perform the touch detection of one detection block in this manner. In the touch detection device 30, each of drive electrode blocks Tx1 to Txi illustrated in FIG. 14 corresponds to the drive electrode E1 in the above-described basic principle of the touch detection. In the touch detection device 30, each of detection blocks Rx1 to Rxq of the touch detection electrodes TDL corresponds to the touch detection electrode E2. The touch detection device 30 is configured to detect a touch according to the above-described basic principle. As illustrated in FIG. 13, the electrode patterns three-dimensionally intersecting each other constitute an electrostatic capacitance type touch sensor in a matrix form. This also enables detection of a position where the external proximity object is in contact therewith or in proximity thereto by scanning the entire touch detection surface of the touch detection device 30.

The TFT substrate 21 corresponds to a specific example of a "substrate" in the present disclosure. The pixel electrodes 22 correspond to a specific example of "pixel electrodes" in the present disclosure. The pixel signal lines SGL correspond to a specific example of "signal lines" in the present disclosure. The drive electrodes COML correspond to a specific example of a "drive electrodes" in the present disclosure. The liquid crystal element LC corresponds to a specific example of a "display function layer" in the present disclosure. The source driver 13 and the drive electrode driver 14 correspond to a specific example of a "scan driving unit" in the present disclosure. The touch detection electrodes TDL correspond to a specific example of "touch detection electrodes" in the present disclosure. The color filter 32 corresponds to a specific example of a "color filter" in the present disclosure.

1-1B. Operations and Actions

Figure 15:
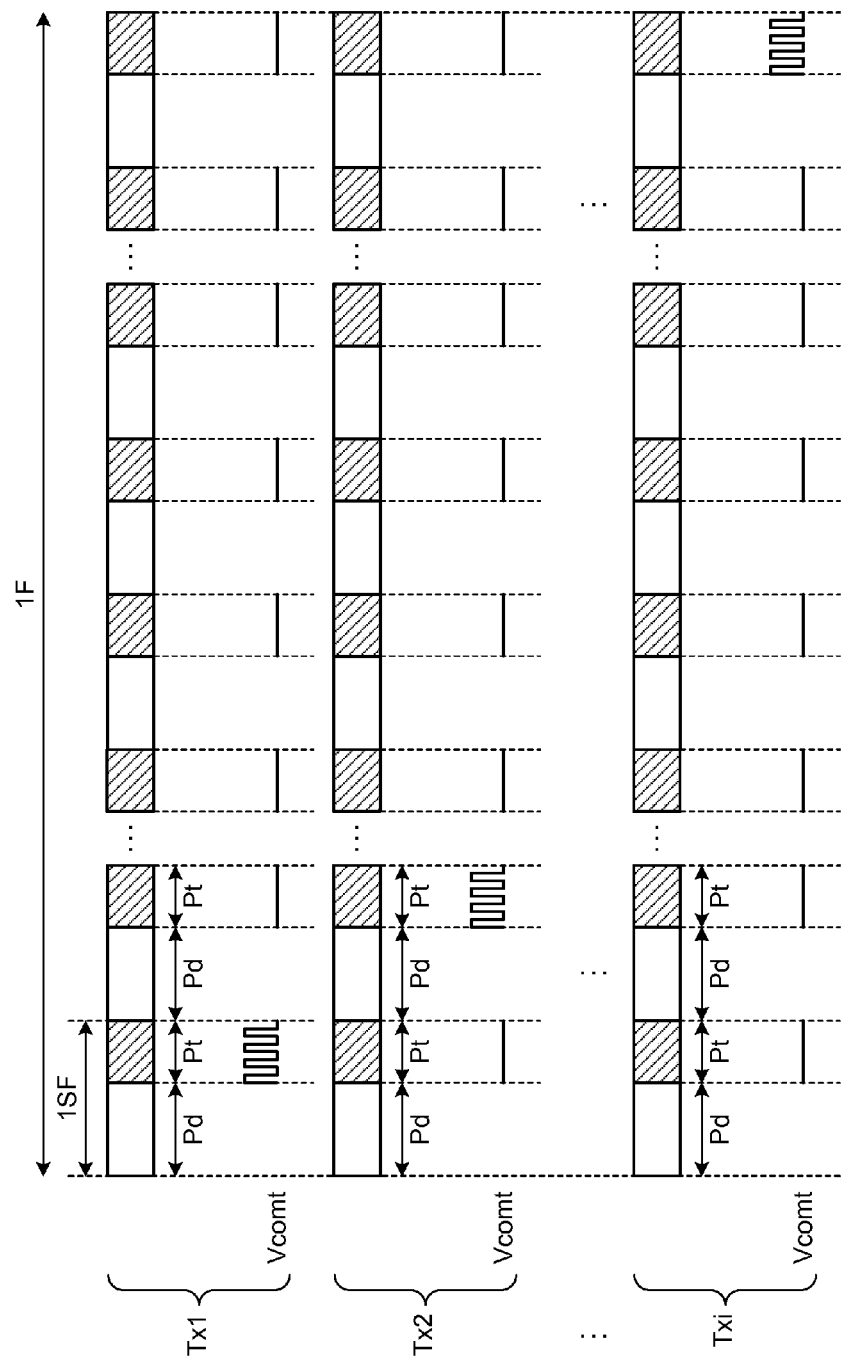
FIG. 15 is a schematic diagram illustrating a relation between a display operation period and a touch detection operation period according to the first embodiment.

A description will be made of operations and effects of the display device with a touch detection function 1 of the first embodiment. FIG. 15 is a schematic diagram illustrating a relation between a display operation period and a touch detection operation period according to the first embodiment.

Because the drive electrode COML functions as a drive electrode of the liquid-crystal display unit 20 and also as a drive electrode of the touch detection device 30, the drive signals Vcom may affect each other. For this reason, the drive signals Vcom are applied to the drive electrodes COML separately in a display operation period Pd in which the display operation is performed, and in a touch detection operation period Pt in which the touch detection operation is performed. The drive electrode driver 14 applies the drive signal Vcom as a display drive signal in the display operation period Pd in which the display operation is performed. The drive electrode driver 14 applies the drive signal Vcom as a touch drive signal in the touch detection operation period Pt in which the touch detection operation is performed. In the description below, the drive signal Vcom as a drive signal for display can be written as a display drive signal Vcomd, and the drive signal Vcom as a drive signal for touch detection can be written as the touch drive signal Vcomt.

Overall Operation Overview

Based on the externally supplied video signal Vdisp, the control unit 11 supplies the control signal to each of the gate driver 12, the source driver 13, the drive electrode driver 14, and the touch detection unit 40, and thus controls them so as to operate in synchronization with each other. The gate driver 12 supplies the scan signals Vscan to the liquid-crystal display unit 20 in the display operation period Pd illustrated in FIG. 15, and thus sequentially selects one horizontal line to be display-driven. The source driver 13 supplies the pixel signal Vpix to each of the pixels Pix constituting the horizontal line selected by the gate driver 12 in the display operation period Pd.

In the display operation period Pd, the drive electrode driver 14 applies the display drive signals Vcomd to the drive electrode blocks Tx1 to Txi related to the horizontal line. In the touch detection operation period Pt, the drive electrode driver 14 sequentially applies the touch drive signals Vcomt having a higher frequency than that of the display drive signals Vcomd to the drive electrode block Tx1 related to the touch detection operation, and thus sequentially selects one of the detection blocks. In the display operation period Pd, the display unit with a touch detection function 10 performs the display operation based on the signals supplied by the gate driver 12, the source driver 13, and the drive electrode driver 14. In the touch detection operation period Pt, the display unit with a touch detection function 10 performs the touch detection operation based on the touch drive signals Vcomt supplied by the drive electrode driver 14, and outputs the touch detection signals Vdet from the touch detection electrodes TDL. The touch detection signal amplifier 42 amplifies and then outputs the touch detection signals Vdet. The A/D converter 43 converts the analog signals output from the touch detection signal amplifier 42 into the digital signals at times synchronized with the touch drive signals Vcomt. The signal processing unit 44 detects existence or non-existence of a touch on the touch detection device 30 based on the output signals of the A/D converter 43. When the touch is detected in the signal processing unit 44, the coordinate extraction unit 45 obtains the touch panel coordinates of the touch, and outputs the touch panel coordinates as the signal output Vout.

Detailed Operation

A detailed operation of the display device with a touch detection function 1 will be described. The liquid-crystal display unit 20 performs the display by sequentially scanning one horizontal line of the adjacent scan signal lines GCL among the scan signal lines GCL at a time according to the scan signal Vscan supplied from the gate driver 12. Also, based on the control signal supplied from the control unit 11, the drive electrode driver 14 supplies the drive signals Vcom to the drive electrodes COML so as to supply the drive signal Vcom to the adjacent drive electrode blocks in order of the columns Tx1, Tx2, . . . , Txi illustrated in FIG. 14, among the drive electrodes COML of the display unit with a touch detection function 10.

In the display device with a touch detection function 1, the drive signals Vcom (the display drive signals Vcomd and the touch drive signals Vcomt) are supplied to the drive electrodes COML separately for the touch detection operation (in the touch detection operation period Pt) and for the display operation (in the display period Pd) in a time-division manner for each horizontal display period 1SF. A frame period 1F is a period that passes while all of the horizontal lines to be display-driven on the display surface of the liquid-crystal display unit 20 are selected. As illustrated in FIGS. 14 and 15, in the touch detection operation, after the frame period 1F passes, the different drive electrodes COML of the drive electrode blocks Tx1 to Txi are selected, and the rectangular waves of the touch drive signals Vcomt are applied to the drive electrodes COML for each horizontal display period 1SF. Thus, the scanning of the touch detection is performed.

For example, as illustrated in FIG. 14, the drive electrode block Tx2 among the drive electrode blocks Tx1 to Txi is selected as the drive electrode block Stx in the second horizontal display period 1SF, and the rectangular waves of the touch drive signals Vcomt are supplied to the drive electrode block Tx2 in the second touch detection operation period Pt illustrated in FIG. 15. At this time, according to the switch control signal SEL, the drive signal selector unit 14S illustrated in FIG. 8 supplies the same rectangular waves of the touch drive signals Vcomt to both the drive electrode COML constituting the drive electrode block Stx and the pixel signal lines SGL facing the drive electrode COML in the orthogonal direction of the substrate.

The drive electrode block Tx1 and the drive electrode blocks Tx3 to Txi are the unselected drive electrode blocks Ntx. The potential of the drive electrodes COML of the unselected drive electrode blocks Ntx is fixed to GND. The potential of the pixel signal lines SGL facing the drive electrodes COML constituting drive electrode blocks Ntx in the orthogonal direction of the substrate is also fixed to GND.

This operation is sequentially repeated from the drive electrode block Tx1 to the drive electrode block Txi, as illustrated in FIG. 14. Thus, the display device with a touch detection function 1 performs the display operation by scanning the entire display surface, and also performs the touch detection operation by scanning the entire touch detection surface.

As described above, in the display period Pd, the display device with a touch detection function 1 applies the display drive signals Vcomd to the drive electrodes COML, and supplies the pixel signals Vpix for displaying the image on the pixel electrodes to the pixel signal lines SGL. In the touch detection operation period Pt, the display device with a touch detection function 1 applies the touch drive signals Vcomt to the drive electrodes COML, and supplies the touch drive signals Vcomt to the pixel signal lines SGL that face, in an overlapping manner in the above-described orthogonal direction, the drive electrodes COML to which the touch drive signals Vcomt are applied. In the touch detection operation period Pt, the three-dimensional intersection between the drive electrodes COML and the pixel signal lines SGL can increase the parasitic capacitance between the drive electrodes COML and the pixel signal lines SGL, so that charging and discharging the drive electrodes COML takes a longer time. As illustrated in FIG. 12, the drive electrodes COML of the first embodiment extend in the direction parallel to the direction of extension of the pixel signal lines SGL described above. This allows the drive electrode driver 14 to supply the same rectangular waves of the touch drive signals Vcomt to both the drive electrodes COML to which the touch drive signals Vcomt are applied and the pixel signal lines SGL that overlap the drive electrodes COML in the direction orthogonal to the TFT substrate 21. This, in turn, results in a reduction by approximately 50% of the parasitic capacitance between the drive electrodes COML and the pixel signal lines SGL in the display device with a touch detection function 1.

1-1C. Advantage

As describe above, suppressing the parasitic capacitance between the drive electrodes COML and the pixel signal lines SGL allows the display device with a touch detection function 1 to suppress the power consumption of the touch detection. This, in turn, can suppress the power supplied to the touch detection unit 40, leading to a possible reduction in the size of driver ICs. This can reduce the size of an electronic apparatus including the display device with a touch detection function 1 of the first embodiment.

The suppression of the parasitic capacitance between the drive electrodes COML and the pixel signal lines SGL also allows the display device with a touch detection function 1 according to the first embodiment to suppress the influence on charging and discharging. This allows the frequency of the rectangular wave of the touch drive signal Vcomt to be increased. This, in turn, results in suppression of an influence of low-frequency noise caused by an AC power supply in the display device with a touch detection function 1 according to the first embodiment. The display device with a touch detection function 1 according to the first embodiment can increase the frequency of the rectangular waves of the touch drive signals Vcomt supplied to the drive electrodes COML, and thus can perform the touch detection in a short time. This allows the display device with a touch detection function 1 according to the first embodiment to cope with an increase in screen area or definition of the touch detection device 30. The display device with a touch detection function 1 according to the first embodiment can reduce the parasitic capacitance between the drive electrodes COML and the pixel signal lines SGL even when the distance between the drive electrodes COML and the pixel signal lines SGL is reduced, and thus can reduce the thickness of the display unit with a touch detection function 10.

1-1D. Modification of First Embodiment

Figure 16:
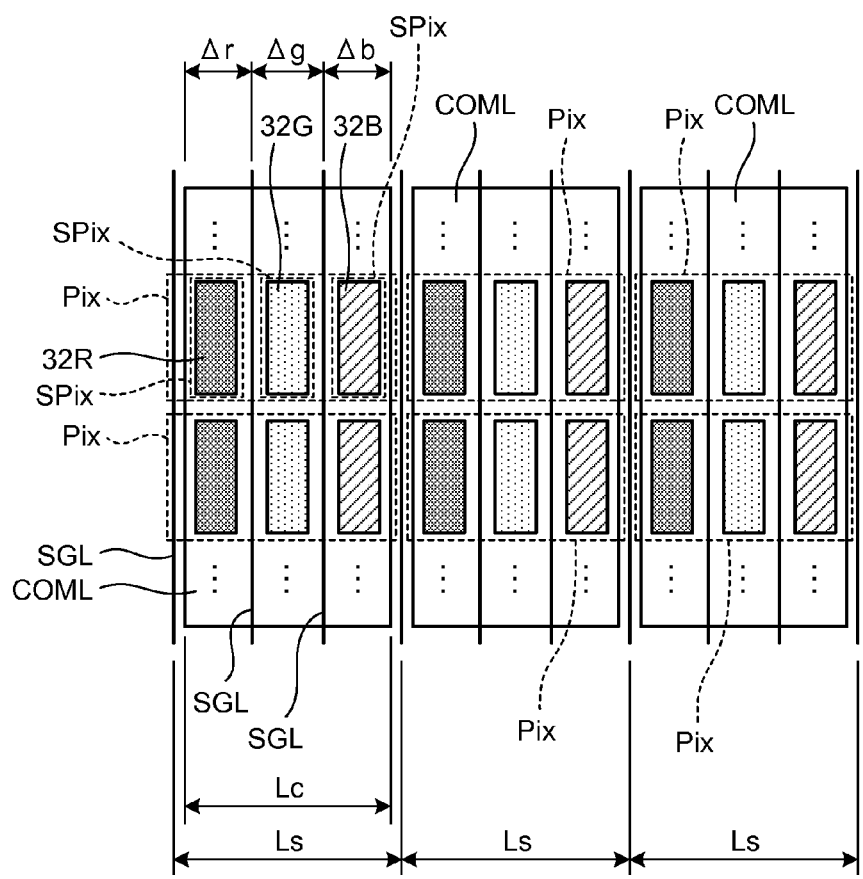
FIG. 16 is a schematic diagram explaining a relation among the drive electrodes, the pixel signal lines, and the pixels in a module implemented with a display device with a touch detection function according to a modification of the first embodiment.

FIG. 16 is a schematic diagram explaining a relation among the drive electrodes, the pixel signal lines, and the pixels in a module implemented with a display device with a touch detection function according to a modification of the first embodiment. As described above, while the drive electrodes COML are transparent, the gaps between the adjacent drive electrodes COML are likely to be noticed as stripes by human eyes. For this reason, in this display device with a touch detection function 1 according to the modification of the first embodiment, the gap between the adjacent drive electrodes COML is positioned between the color region 32R of red (R) and the color region 32B of blue (B) whose brightnesses are relatively low. This can reduce the aperture ratio of the color region 32R of red (R) and the color region 32B of blue (B). For example, in the display device with a touch detection function 1 according to the modification of the first embodiment, as illustrated in FIG. 16, the length between the pixel signal lines SGL each lying between the color region 32R of red (R) and the color region 32B of blue (B) is denoted as Ls, and the length of the width of the drive electrode COML orthogonal to the extending direction thereof is denoted as Lc. In the display device with a touch detection function 1 according to the modification of the first embodiment, as illustrated in FIG. 16, the pixel signal lines SGL are arranged with the sub-pixels SPix illustrated in FIG. 10 interposed therebetween, the sub-pixels SPix overlapping the red color region 32R of red (R), the green color region 32G of green (G), and the blue color region 32B of blue (B) of the color filter 32 when viewed in the direction orthogonal to the surface of the TFT substrate 21 as described above. The lengths between the pixel signal lines SGL thus arranged are denoted as a width $\Delta r$, a width $\Delta g$, and a width $\Delta b$.

The gap between the adjacent drive electrodes COML is positioned between the color region 32R of red (R) and the color region 32B of blue (B) whose brightnesses are relatively low. This maintains the aperture ratio of the color region 32G of green (G) having a higher brightness than those of the color region 32R of red (R) and the color region 32B of blue (B). Making the widths $\Delta r$ and $\Delta b$ larger than the width $\Delta g$ can increase the aperture ratios of the color region 32R of red (R) and the color region 32B of blue (B). In the display device with a touch detection function 1 according to the modification of the first embodiment, the color region 32R of red (R) and the color region 32B of blue (B) of the color filter 32 are arranged with the color region 32G of green (G) interposed therebetween, and the width of each of the color region 32R of red (R) and the color region 32B of blue (B) in a direction orthogonal to the extending direction thereof is smaller than the width of the color region 32G of green (G) in a direction orthogonal to the extending direction thereof. This can equalize transmittance values of the color regions 32R, 32G, and 32B of the color filter 32 colored in the three colors of red (R), green (G), and blue (B) in the display device with a touch detection function 1 according to the modification of the first embodiment. For example, each of the widths $\Delta r$ and $\Delta b$ can be larger than the width $\Delta g$ by approximately [(length Ls−length Lc)/2].

In the display device with a touch detection function 1 according to the modification of the first embodiment, the length of the gap between the adjacent drive electrodes COML is periodically arranged on a pixel Pix by pixel Pix basis. This reduces the possibility that the person notices the stripes associated with the gaps between the adjacent drive electrodes COML.

1-2. Second Embodiment

Figure 17:
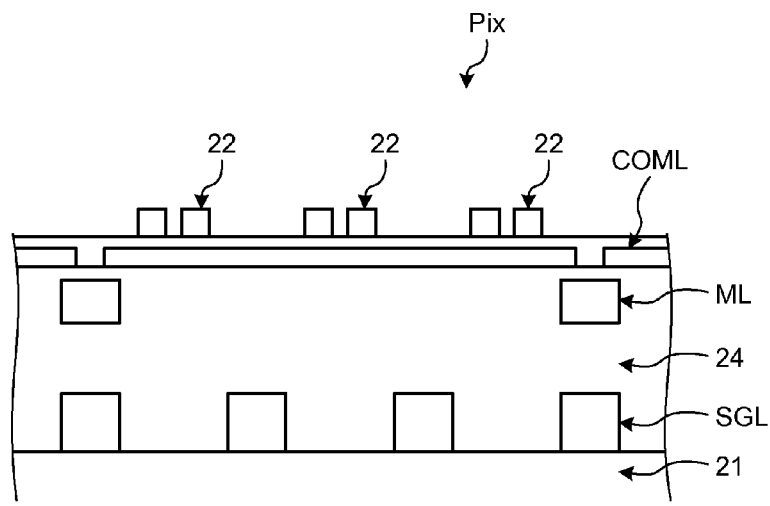
FIG. 17 is a schematic diagram of a cross section, explaining a relation among the drive electrodes, the pixel signal lines, and the pixel electrodes in a module implemented with a display device with a touch detection function according to a second embodiment of the present disclosure.
Figure 18:
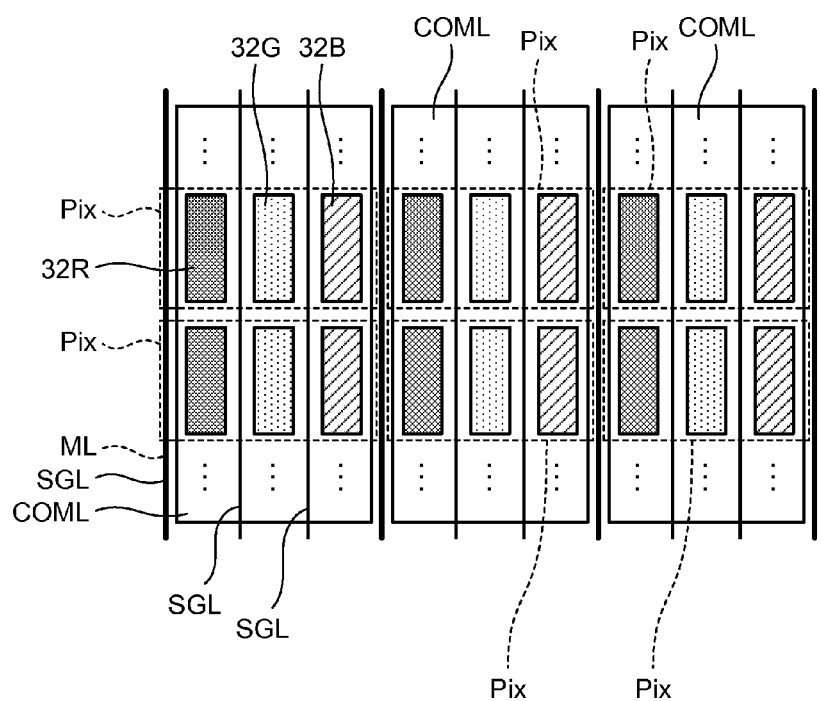
FIG. 18 is a schematic diagram explaining a relation among the drive electrodes, the pixel signal lines, and the pixels in the module implemented with the display device with a touch detection function according to the second embodiment.

A display device with a touch detection function 1 according to a second embodiment of the present disclosure will be described. FIG. 17 is a schematic diagram of a cross section, explaining a relation among the drive electrodes, the pixel signal lines, and the pixel electrodes in a module implemented with the display device with a touch detection function according to the second embodiment. FIG. 18 is a schematic diagram explaining a relation among the drive electrodes, the pixel signal lines, and the pixels in the module implemented with the display device with a touch detection function according to the second embodiment. The same constituent elements as those described in the first embodiment above will be given the same numerals, and duplicate description thereof will be omitted.

As illustrated in FIG. 17, the drive electrodes COML face the pixel electrodes 22 in the direction orthogonal to the surface of the TFT substrate 21. As illustrated in FIGS. 17 and 18, each one of the drive electrodes COML is arranged so as to correspond to three of the pixel electrodes 22 (pixel electrodes 22 constituting three columns).

As illustrated in FIG. 18, the drive electrodes COML extend in the direction parallel to the direction of extension of the pixel signal lines SGL described above. The color regions 32R, 32G, and 32B of the three colors of R, G, and B are assigned to the sub-pixels SPix of the pixel Pix illustrated in FIG. 10 mentioned above. As illustrated in FIG. 18, a gap between the adjacent drive electrodes COML is positioned between the adjacent pixels Pix. Each of metal auxiliary wirings ML is arranged in the insulation layer 24 that lies between the corresponding gap between the adjacent drive electrodes COML and the pixel signal line SGL facing the corresponding gap in the direction orthogonal to the surface of the TFT substrate 21. The metal auxiliary wirings ML extend in the direction parallel to the direction of extension of the pixel signal lines SGL. The metal auxiliary wirings ML and the drive electrodes COML are configured such that the drive signals Vcom having an alternating-current rectangular waveform are applied from the drive electrode driver 14 to the drive electrodes COML and the metal auxiliary wirings ML via contact conductive columns (not illustrated) having electrical conductivity.

Supplying the same rectangular waves of the touch drive signals Vcomt to the drive electrodes COML and the pixel signal lines SGL makes the metal auxiliary wirings ML have the same potential as that of the drive electrodes COML and the pixel signal lines SGL, thereby suppressing a potential change applied to the liquid crystal layer 6 and thus reducing a transmission loss.

1-2A. Modification of Second Embodiment

Figure 19:
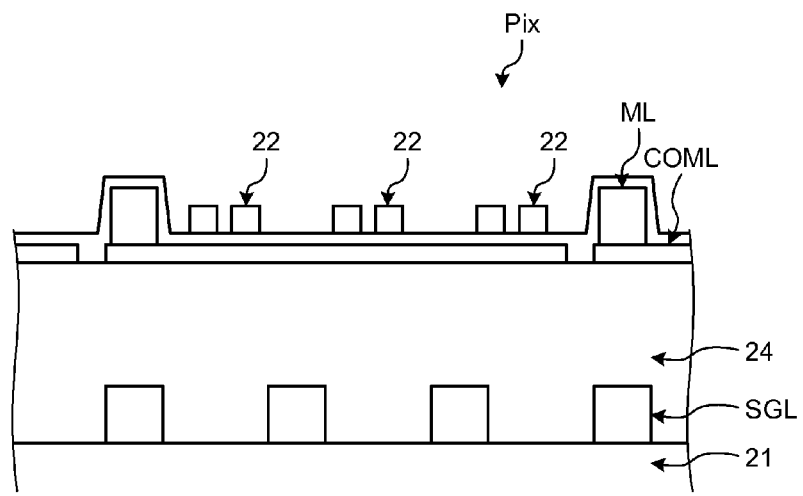
FIG. 19 is a schematic diagram of a cross section, explaining a relation among the drive electrodes, the pixel signal lines, and the pixel electrodes in a module implemented with a display device with a touch detection function according to a modification of the second embodiment.
Figure 20:
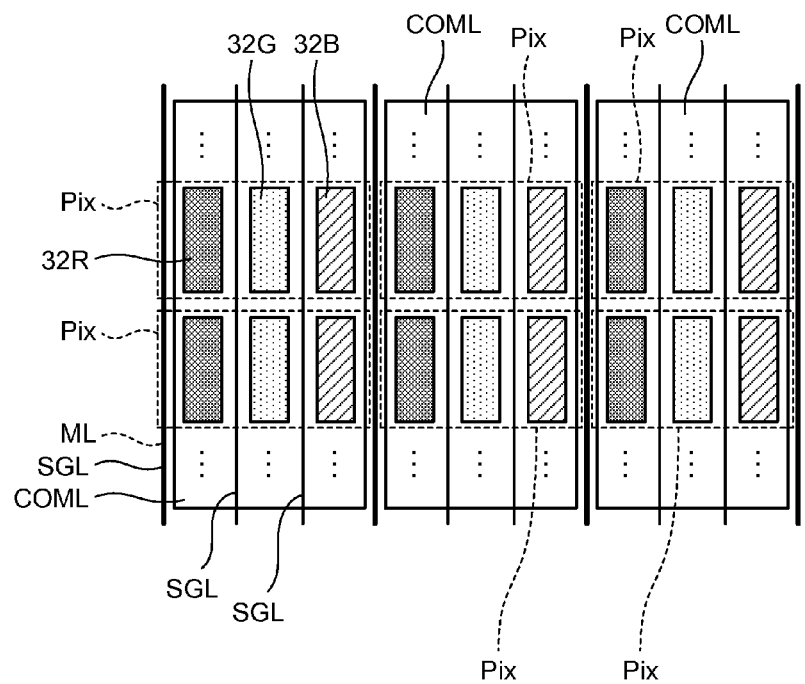
FIG. 20 is a schematic diagram explaining a relation among the drive electrodes, the pixel signal lines, and the pixels in the module implemented with the display device with a touch detection function according to the modification of the second embodiment.

FIG. 19 is a schematic diagram of a cross section, explaining a relation among the drive electrodes, the pixel signal lines, and the pixel electrodes in a module implemented with a display device with a touch detection function according to a modification of the second embodiment. FIG. 20 is a schematic diagram explaining a relation among the drive electrodes, the pixel signal lines, and the pixels in the module implemented with the display device with a touch detection function according to the modification of the second embodiment. The same constituent elements as those described in the first embodiment above will be given the same numerals, and duplicate description thereof will be omitted.

As illustrated in FIG. 19, the drive electrodes COML face the pixel electrodes 22 in the direction orthogonal to the surface of the TFT substrate 21. As illustrated in FIGS. 19 and 20, each one of the drive electrodes COML is arranged so as to correspond to three of the pixel electrodes 22 (pixel electrodes 22 constituting three columns).

As illustrated in FIG. 20, the drive electrodes COML extend in the direction parallel to the direction of extension of the pixel signal lines SGL described above. The color regions 32R, 32G, and 32B of the three colors of R, G, and B are assigned to the sub-pixels SPix of the pixel Pix illustrated in FIG. 10 mentioned above. As illustrated in FIG. 20, a gap between the adjacent drive electrodes COML is positioned between the adjacent pixels Pix. Each of metal auxiliary wirings ML is stacked at an edge of the corresponding drive electrode COML near the gap between the adjacent drive electrodes COML. The metal auxiliary wirings ML extend in the direction parallel to the direction of extension of the pixel signal lines SGL. Each of the metal auxiliary wirings ML faces the corresponding pixel line SGL of the pixel signal lines SGL in the direction orthogonal to the surface of the TFT substrate 21. The metal auxiliary wirings ML and the drive electrodes COML are configured such that the drive signals Vcom having an alternating-current rectangular waveform are applied from the drive electrode driver 14 to the drive electrodes COML and the metal auxiliary wirings ML via contact conductive columns (not illustrated) having electrical conductivity.

Supplying the same rectangular waves of the touch drive signals Vcomt to the drive electrodes COML and the pixel signal lines SGL makes the metal auxiliary wirings ML have the same potential as that of the drive electrodes COML and the pixel signal lines SGL, thereby suppressing the potential change applied to the liquid crystal layer 6 and thus reducing the transmission loss. The metal auxiliary wirings ML can use metal having a lower resistance than that of the drive electrode COML, such as aluminum (Al), copper (Cu), gold (Au), or one or more alloys of these metals. This makes the display device with a touch detection function 1 according to the modification of the second embodiment less likely to be affected by a voltage drop of the drive electrode COML and capable of coping with an increase in screen size.

1-2B. Advantage

As described above, the parasitic capacitance between the drive electrodes COML and the pixel signal lines SGL is suppressed in the display device with a touch detection function 1 according to the second embodiment or the modification thereof. This allows the display device with a touch detection function 1 to suppress the power consumption of the touch detection. This, in turn, can suppress the power supplied to the touch detection unit 40, leading to a possible reduction in the size of the driver ICs. This can reduce the size of an electronic apparatus including the display device with a touch detection function 1 of the second embodiment or the modification thereof.

The suppression of the parasitic capacitance among the metal auxiliary wirings ML, the drive electrodes COML, and the pixel signal lines SGL allows the display device with a touch detection function 1 according to the second embodiment or the modification thereof to suppress the influence on charging and discharging. This allows the frequency of the rectangular wave of the touch drive signal Vcomt to be increased. This, in turn, results in suppression of the influence of the low-frequency noise caused by the AC power supply in the display device with a touch detection function 1 according to the second embodiment or the modification thereof. The display device with a touch detection function 1 according to the second embodiment or the modification thereof can increase the frequency of the rectangular waves of the touch drive signals Vcomt supplied to the metal auxiliary wirings ML and the drive electrodes COML, and thus can perform the touch detection in a short time. This allows the display device with a touch detection function 1 according to the second embodiment or the modification thereof to cope with an increase in screen area or definition of the touch detection device 30. The display device with a touch detection function 1 according to the second embodiment or the modification thereof can reduce the parasitic capacitance between the drive electrodes COML and the pixel signal lines SGL even when the distance between the drive electrodes COML and the pixel signal lines SGL is reduced, and thus can reduce the thickness of the display unit with a touch detection function 10.

1-3. Third Embodiment

Figure 21:
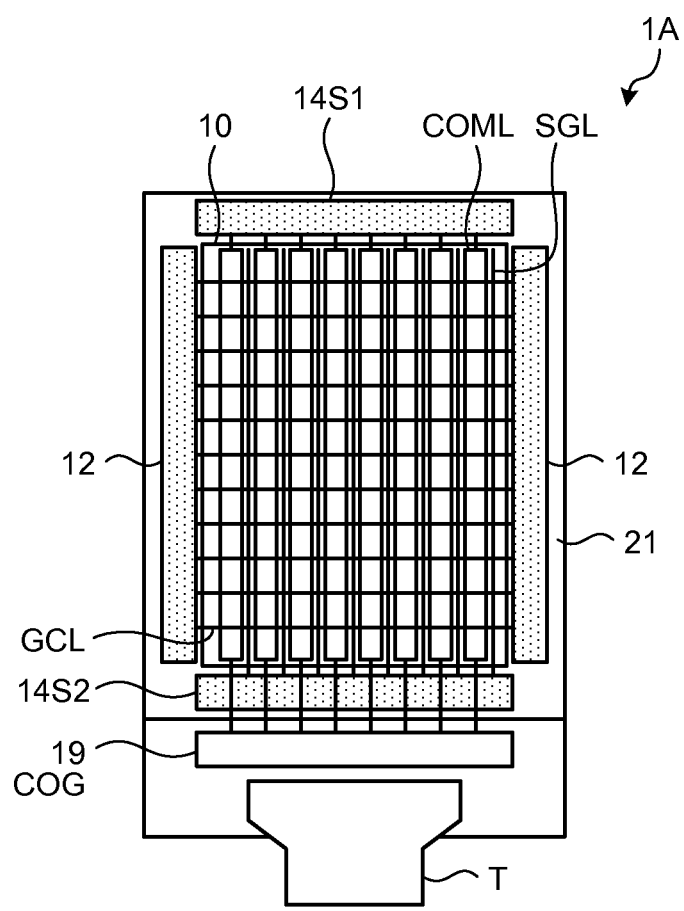
FIG. 21 is a diagram illustrating an example of a module implemented with a display device with a touch detection function according to a third embodiment of the present disclosure.
Figure 22:
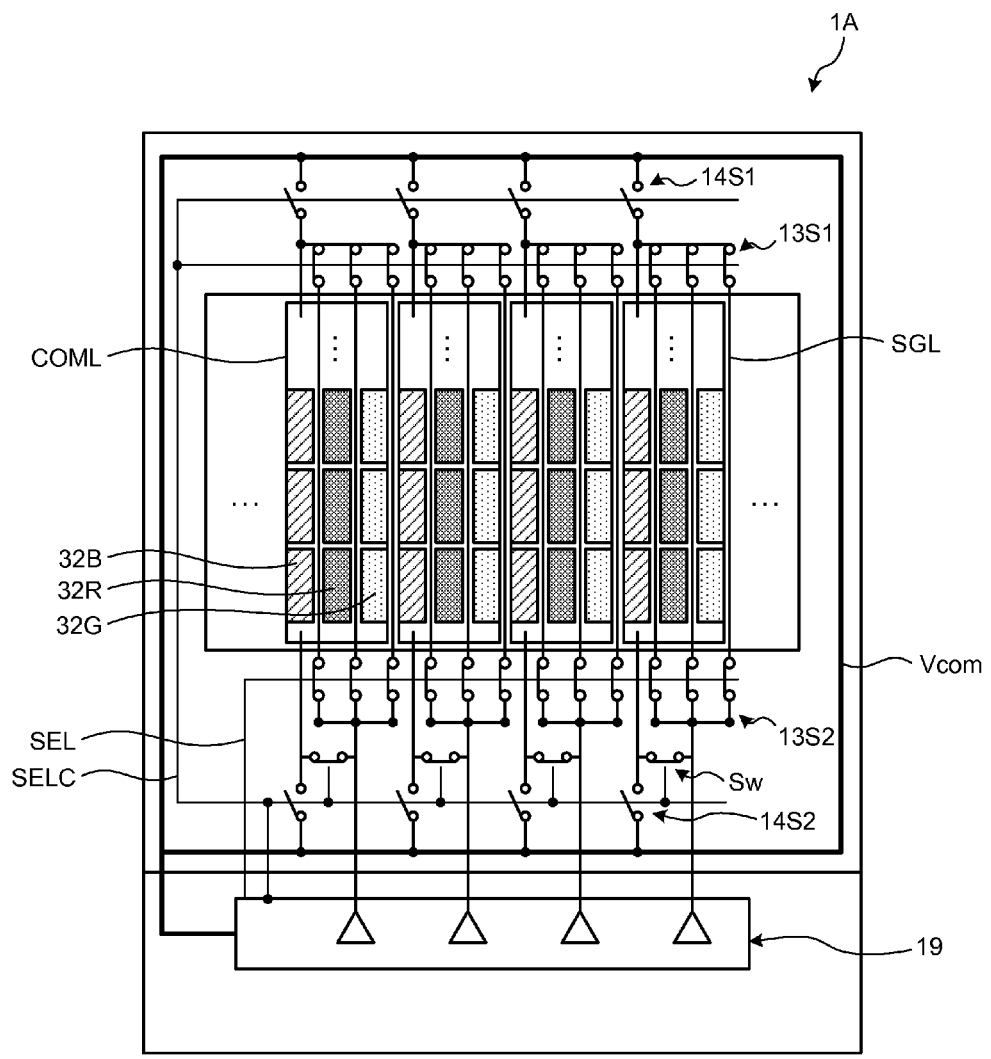
FIG. 22 is a schematic diagram explaining a relation between the drive electrodes and the pixel signal lines in the module implemented with the display device with a touch detection function according to the third embodiment.

A display device with a touch detection function 1A according to a third embodiment of the present disclosure will be described. FIG. 21 is a diagram illustrating an example of a module implemented with the display device with a touch detection function according to the third embodiment. FIG. 22 is a schematic diagram explaining a relation between the drive electrodes and the pixel signal lines in the module implemented with the display device with a touch detection function according to the third embodiment. The same constituent elements as those described in the first embodiment or the second embodiment above will be given the same numerals, and duplicate description thereof will be omitted.

FIG. 21 schematically illustrates, in the direction orthogonal to the surface of the TFT substrate 21 described above, the display unit with a touch detection function 10 having the drive electrodes COML, and the scan signal lines GCL that are formed so as to three-dimensionally intersect the drive electrodes COML and are coupled to the gate driver 12. FIG. 21 also schematically illustrates, in the direction orthogonal to the surface of the TFT substrate 21, the display unit with a touch detection function 10 having the drive electrodes COML, and the pixel signal lines SGL that are formed so as to extend in a direction not intersecting but parallel to the drive electrodes COML. The drive signal selector units 14S1 and 14S2 are arranged with both ends in the extending direction of the drive electrodes COML interposed therebetween.

As illustrated in FIG. 22, in the display device with a touch detection function 1A, the pixel signal lines SGL are coupled via the source selector units 13S1 and 13S2 to the source driver 13 built into the COG 19. The source selector units 13S1 and 13S2 are arranged with both ends in the extending direction of the pixel signal lines SGL interposed therebetween. The source selector unit 13S1 performs on/off operations according to the switch control signal SEL. The source selector unit 13S2 performs on/off operations according to the switch control signal SELC. The drive signal selector unit 14S1 and the drive signal selector unit 14S2 on the side of the drive electrode driver 14 included in COG 19 are arranged with both ends in the extending direction of the drive electrodes COML interposed therebetween. The drive signal selector units 14S1 and 14S2 perform on/off operations according to the switch control signal SELC. The display device with a touch detection function 1A according to the third embodiment includes drive electrode/signal line selector switches SW that turn on and off the electric couplings between the drive electrodes COML and the pixel signal lines SGL according to the switch control signal SELC. In the display device with a touch detection function 1A, the drive electrodes COML are coupled to the drive electrode driver 14 built into the COG 19. The color filter 32 includes the color regions 32R, 32G, and 32B colored in the three colors of red (R), green (G), and blue (B). The color filter 32 faces the drive electrodes COML in the direction orthogonal to the TFT substrate 21, and overlaps the drive electrodes COML when viewed in the direction orthogonal to the surface of the TFT substrate 21.

As illustrated in FIG. 22, the drive electrodes COML of the third embodiment extend in the direction parallel to the direction of extension of the pixel signal lines SGL described above. For example, in the display period Pd, the display device with a touch detection function 1A uncouples the drive electrode/signal line selector switches SW between the drive electrodes COML and the pixel signal lines SGL according to the switch control signal SELC, so as to apply the display drive signals Vcomd to the drive electrodes COML. In addition, in the display period Pd, the display device with a touch detection function 1A operates the source selector unit 13S1 to open according to the switch control signal SELC and the source selector unit 13S2 to open and close according to the switch control signal SEL, and thus supplies the pixel signals Vpix for displaying the image on the pixel electrodes to the pixel signal lines SGL. This allows the source selector units 13S1 and 13S2 to keep the pixel signal lines SGL from shorting.

In the touch detection operation period Pt, the display device with a touch detection function 1A couples the drive electrode/signal line selector switches SW between the drive electrodes COML and the pixel signal lines SGL according to the switch control signal SELC. Then, the display device with a touch detection function 1A applies the touch drive signals Vcomt to the drive electrodes COML, and supplies the touch drive signals Vcomt to the pixel signal lines SGL that face, in an overlapping manner in the above-described orthogonal direction, the drive electrodes COML to which the touch drive signals Vcomt are applied. This allows the drive electrode driver 14 to supply the same rectangular waves of the touch drive signals Vcomt from both ends in the extending direction of the drive electrodes COML and the pixel signal lines SGL to the drive electrodes COML and the pixel signal lines SGL.

1-3A. Advantage

As described above, the display device with a touch detection function 1A according to the third embodiment supplies the same rectangular waves of the touch drive signals Vcomt from both ends in the extending direction of the drive electrodes COML and the pixel signal lines SGL to the drive electrodes COML and the pixel signal lines SGL, and thus can suppress a voltage drop and increase the screen size or definition of the display unit with a touch detection function 10.

1-4. Fourth Embodiment

Figure 23:
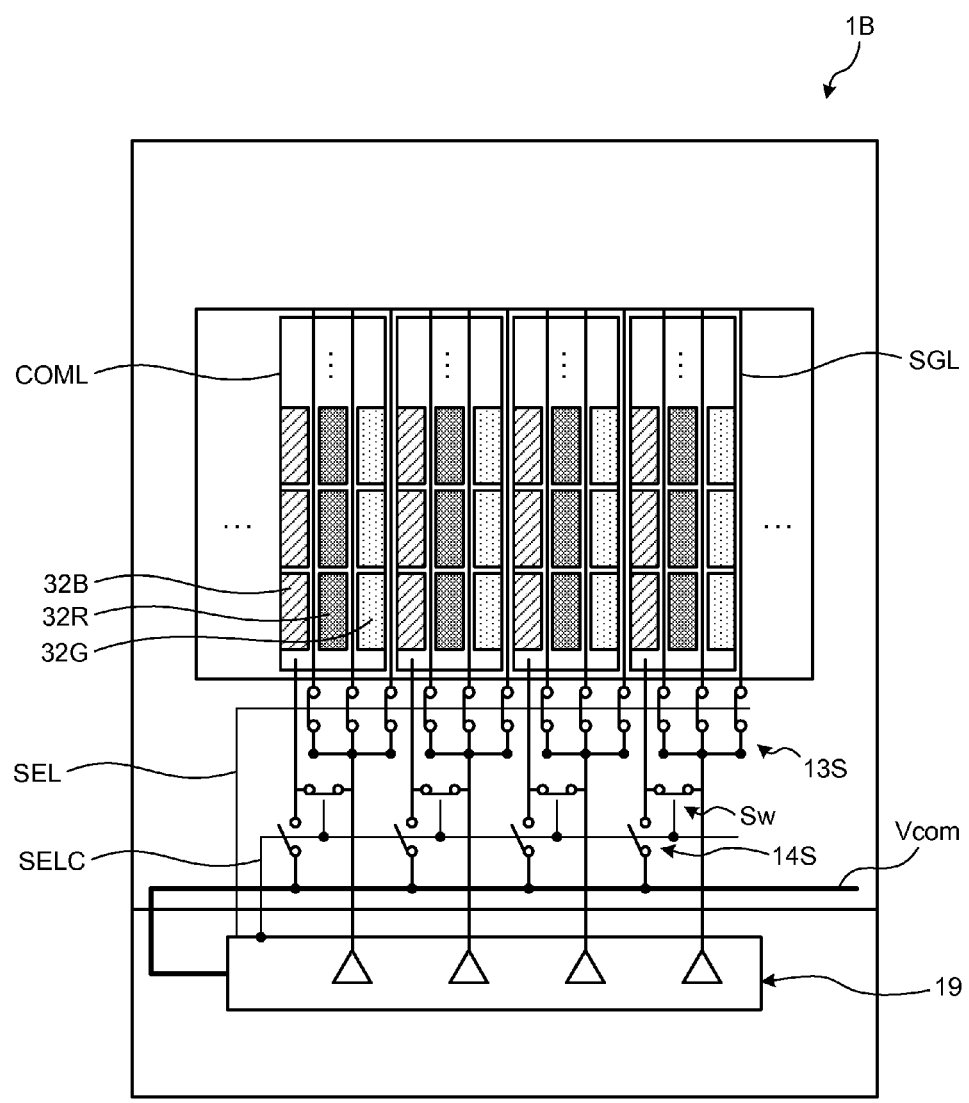
FIG. 23 is a schematic diagram explaining a relation between the drive electrodes and the pixel signal lines in a module implemented with a display device with a touch detection function according to a fourth embodiment of the present disclosure.

A display device with a touch detection function 1B according to a fourth embodiment of the present disclosure will be described. FIG. 23 is a schematic diagram explaining a relation between the drive electrodes and the pixel signal lines in a module implemented with the display device with a touch detection function according to the fourth embodiment. The same constituent elements as those described in the first embodiment or the second embodiment above will be given the same numerals, and duplicate description thereof will be omitted.

FIG. 23 schematically illustrates, in the direction orthogonal to the surface of the TFT substrate 21 as described above, the display unit with a touch detection function 10 having the drive electrodes COML, and the scan signal lines GCL that are formed so as to three-dimensionally intersect the drive electrodes COML and are coupled to the gate driver 12. FIG. 23 also schematically illustrates, in the direction orthogonal to the surface of the TFT substrate 21, the display unit with a touch detection function 10 having the drive electrodes COML, and the pixel signal lines SGL that are formed so as to extend in a direction not intersecting but parallel to the drive electrodes COML.

As illustrated in FIG. 23, in the display device with a touch detection function 1B, the pixel signal lines SGL are coupled via the source selector unit 13S to the source driver 13 built into the COG 19. The source selector unit 13S performs on/off operations according to the switch control signal SEL. The drive signal selector unit 14S also performs on/off operations according to the switch control signal SELC. The display device with a touch detection function 1B according to the fourth embodiment includes the drive electrode/signal line selector switches SW that turn on and off the electric couplings between the drive electrodes COML and the pixel signal lines SGL according to the switch control signal SELC. In the display device with a touch detection function 1B, the drive electrodes COML are coupled to the drive electrode driver 14 built into the COG 19. The color filter 32 includes the color regions 32R, 32G, and 32B colored in the three colors of red (R), green (G), and blue (B). The color filter 32 faces the drive electrodes COML in the direction orthogonal to the TFT substrate 21, and overlaps the drive electrodes COML when viewed in the direction orthogonal to the surface of the TFT substrate 21.

As illustrated in FIG. 22, the drive electrodes COML of the fourth embodiment extend in the direction parallel to the direction of extension of the pixel signal lines SGL described above. For example, in the display period Pd, the display device with a touch detection function 1B uncouples the drive electrode/signal line selector switches SW between the drive electrodes COML and the pixel signal lines SGL according to the switch control signal SELC, and applies the display drive signals Vcomd to the drive electrodes COML while supplying, to the pixel signal lines SGL, the pixel signals Vpix for displaying the image on the pixel electrodes. In the touch detection operation period Pt, the display device with a touch detection function 1B couples the drive electrode/signal line selector switches SW between the drive electrodes COML and the pixel signal lines SGL according to the switch control signal SELC. Then, the display device with a touch detection function 1B applies the touch drive signals Vcomt to the drive electrodes COML, and supplies the touch drive signals Vcomt to the pixel signal lines SGL that face, in an overlapping manner in the above-described orthogonal direction, the drive electrodes COML to which the touch drive signals Vcomt are applied. This allows the drive electrode driver 14 to supply the same rectangular waves of the touch drive signals Vcomt to the drive electrodes COML and the pixel signal lines SGL.

1-4A. Advantageous Effects

As describe above, suppressing the parasitic capacitance between the drive electrodes COML and the pixel signal lines SGL allows display device with a touch detection function 1B to suppress the power consumption of the touch detection. This, in turn, can suppress the power supplied to the touch detection unit 40, leading to a possible reduction in the size of the driver ICs. This can reduce the size of an electronic apparatus including the display device with a touch detection function 1B of the fourth embodiment.

The suppression of the parasitic capacitance between the drive electrodes COML and the pixel signal lines SGL also allows the display device with a touch detection function 1B according to the fourth embodiment to suppress the influence on charging and discharging. This allows the frequency of the rectangular wave of the touch drive signal Vcomt to be increased. This, in turn, results in suppression of the influence of the low-frequency noise caused by the AC power supply in the display device with a touch detection function 1B according to the fourth embodiment. The display device with a touch detection function 1B according to the fourth embodiment can increase the frequency of the rectangular waves of the touch drive signals Vcomt supplied to the drive electrodes COML, and thus can perform the touch detection in a short time. This allows the display device with a touch detection function 1B according to the fourth embodiment to cope with an increase in screen area or definition of the touch detection device 30. The display device with a touch detection function 1B according to the fourth embodiment can reduce the parasitic capacitance between the drive electrodes COML and the pixel signal lines SGL even when the distance between the drive electrodes COML and the pixel signal lines SGL is reduced, and thus can reduce the thickness of the display unit with a touch detection function 10.

1-5. Other Embodiments and Modifications

While the embodiments are described above by way of several embodiments and modifications thereof, the present disclosure is not limited to these embodiments, and various modifications are possible.

In the display devices with a touch detection function 1 and 1A according to the embodiments or the modifications thereof described above, the liquid-crystal display unit 20 using the liquid crystals of one of the various modes, such as the FFS mode and the IPS mode, can be integrated with the touch detection device 30 to provide the display unit with a touch detection function 10. The display unit with a touch detection function 10 may instead be provided by integrating the touch detection device with liquid crystals of one of various modes, such as a twisted nematic (TN) mode, a vertical alignment (VA) mode, and an electrically controlled birefringence (ECB) mode.

The display devices with a touch detection function 1 and 1A may use, for example, the liquid crystals of the horizontal electric field mode. The above-described embodiments use what is called the in-cell type device obtained by integrating the liquid-crystal display unit 20 with the electrostatic capacitance type touch detection device 30. However, not limited to this, for example, the embodiments may instead be equipped with the liquid-crystal display unit 20 and the electrostatic capacitance type touch detection device 30. Also in this case, the configurations described above allow the embodiments to perform the touch detection while suppressing the influence of external noise and noise (corresponding to the internal noise in the above-described embodiments) transmitted from the liquid-crystal display unit.

2. APPLICATION EXAMPLES

Next, with reference to FIGS. 24 to 35, a description will be made of application examples of the display device with a touch detection function 1 described in the embodiments and the modifications thereof. FIGS. 24 to 35 are diagrams illustrating examples of electronic apparatuses to which the display device with a touch detection function according to the embodiments of the present disclosure is applied. The display devices with a touch detection function 1 according to the first, the second, the third, and the fourth embodiments, and the modifications thereof can be applied to electronic apparatuses of all fields, such as television devices, digital cameras, notebook type personal computers, portable electronic apparatuses including mobile phones, and video cameras. In other words, the display devices with a touch detection function 1 according to the first, the second, the third, and the fourth embodiments, and the modifications thereof can be applied to electronic apparatuses of all fields that display externally received video signals or internally generated video signals as images or video pictures.

Application Example 1

Figure 24:
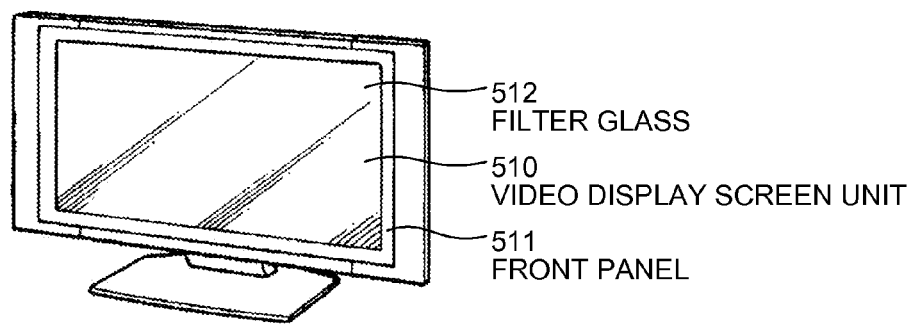
FIG. 24 is a diagram illustrating an example of an electronic apparatus to which the display device with a touch detection function according to the embodiments of the present disclosure is applied.

The electronic apparatus illustrated in FIG. 24 is a television device to which the display device with a touch detection function 1 according to the first, the second, the third, or the fourth embodiment, or the modification thereof is applied. This television device includes, for example, a video display screen unit 510 that includes a front panel 511 and a filter glass 512. The video display screen unit 510 is the display device with a touch detection function according to the first, the second, the third, or the fourth embodiment, or the modification thereof.

Application Example 2

Figure 25:
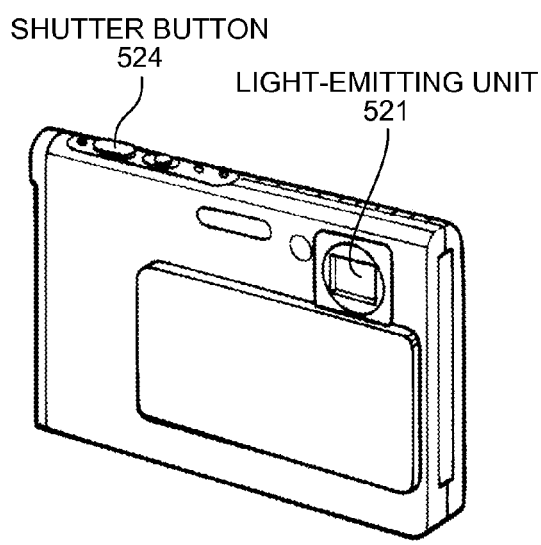
FIG. 25 is a diagram illustrating an example of an electronic apparatus to which the display device with a touch detection function according to the embodiments is applied.
Figure 26:
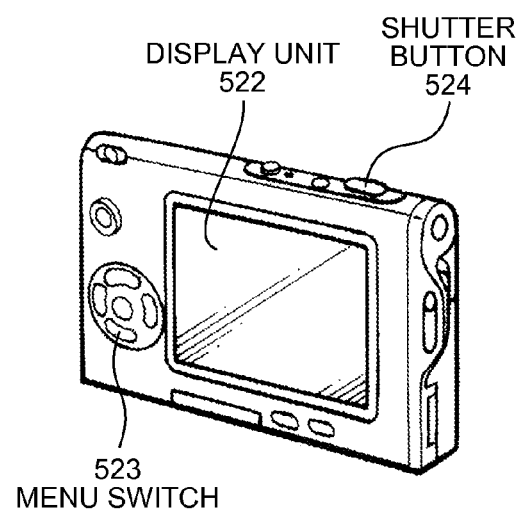
FIG. 26 is a diagram illustrating an example of an electronic apparatus to which the display device with a touch detection function according to the embodiments is applied.

The electronic apparatus illustrated in FIGS. 25 and 26 is a digital camera to which the display device with a touch detection function 1 according to the first, the second, the third, or the fourth embodiment, or the modification thereof is applied. This digital camera includes, for example, a light-emitting unit 521 for flash, a display unit 522, a menu switch 523, and a shutter button 524. The display unit 522 is the display device with a touch detection function according to the first, the second, the third, or the fourth embodiment, or the modification thereof.

Application Example 3

Figure 27:
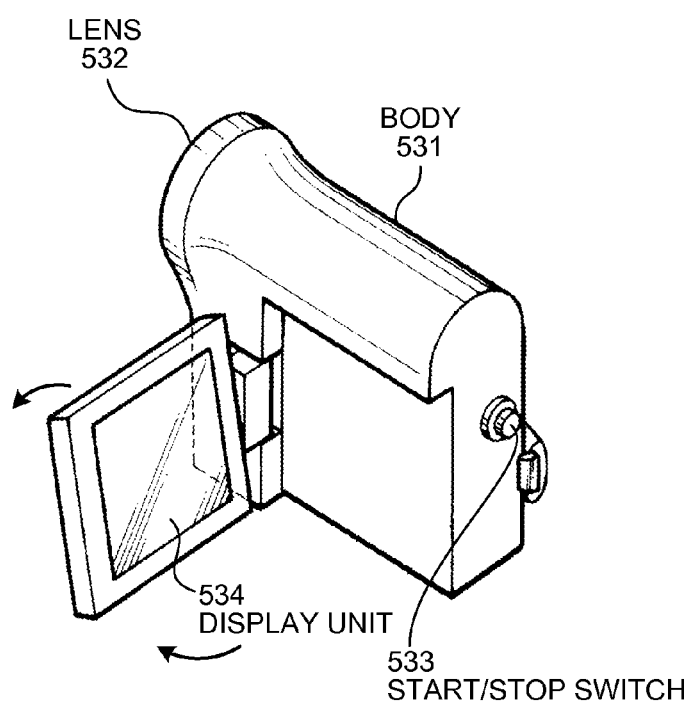
FIG. 27 is a diagram illustrating an example of an electronic apparatus to which the display device with a touch detection function according to the embodiments is applied.

The electronic apparatus illustrated in FIG. 27 represents an external appearance of a video camera to which the display device with a touch detection function 1 according to the first, the second, the third, or the fourth embodiment, or the modification thereof is applied. This video camera includes, for example, a body 531, a lens 532 for taking a subject provided on the front side face of the body 531, and a start/stop switch 533 and a display unit 534 used during shooting. The display unit 534 is the display device with a touch detection function according to the first, the second, the third, or the fourth embodiment, or the modification thereof.

Application Example 4

Figure 28:
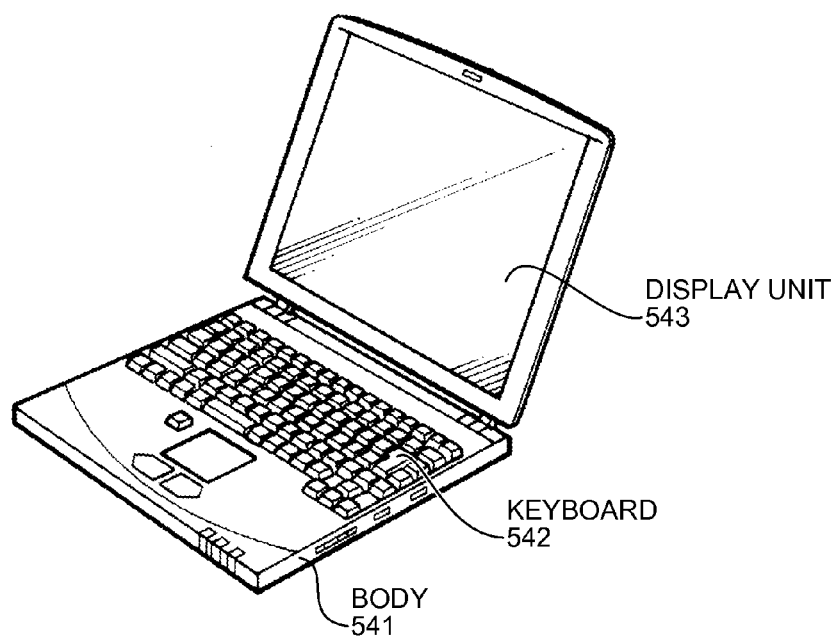
FIG. 28 is a diagram illustrating an example of an electronic apparatus to which the display device with a touch detection function according to the embodiments is applied.
Figure 29:
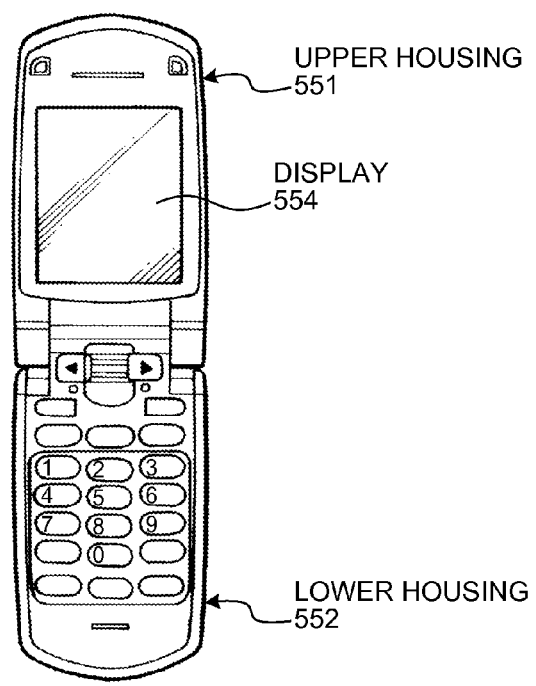
FIG. 29 is a diagram illustrating an example of an electronic apparatus to which the display device with a touch detection function according to the embodiments is applied.
Figure 30:
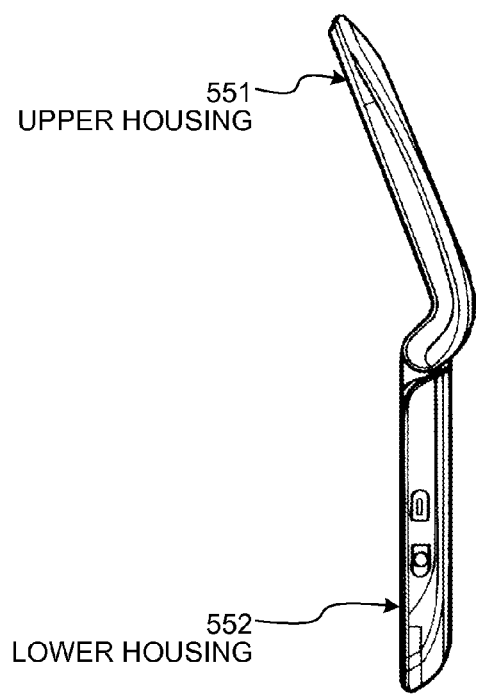
FIG. 30 is a diagram illustrating an example of an electronic apparatus to which the display device with a touch detection function according to the embodiments is applied.
Figure 31:
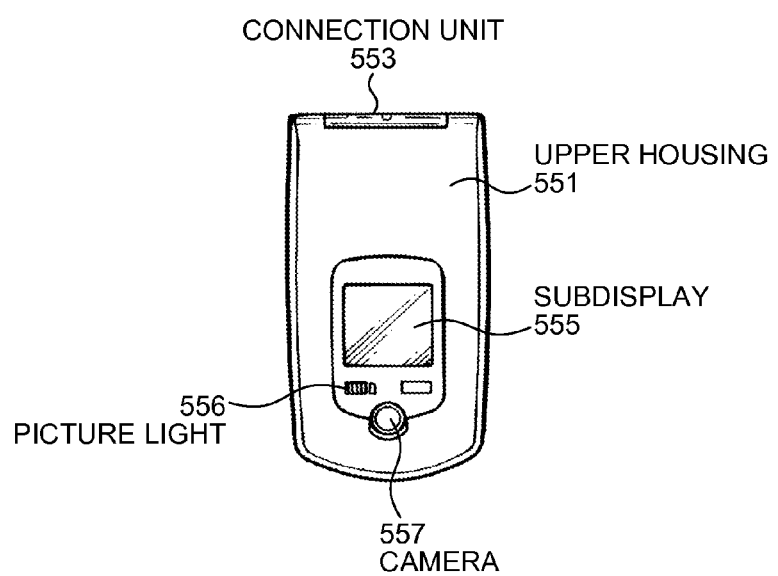
FIG. 31 is a diagram illustrating an example of an electronic apparatus to which the display device with a touch detection function according to the embodiments is applied.
Figure 32:
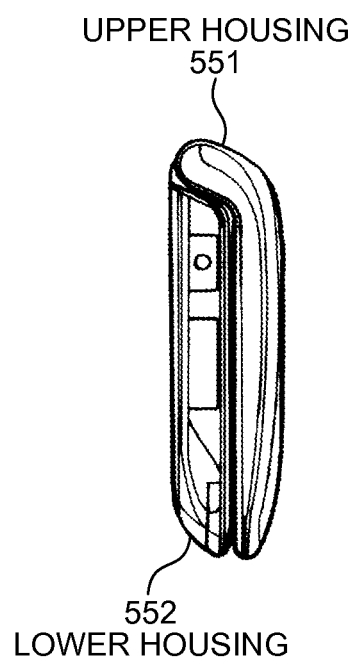
FIG. 32 is a diagram illustrating an example of an electronic apparatus to which the display device with a touch detection function according to the embodiments is applied.
Figure 33:
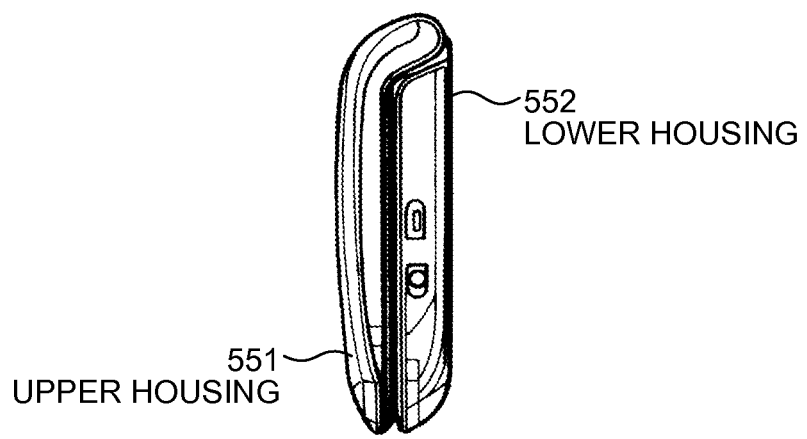
FIG. 33 is a diagram illustrating an example of an electronic apparatus to which the display device with a touch detection function according to the embodiments is applied.
Figure 34:
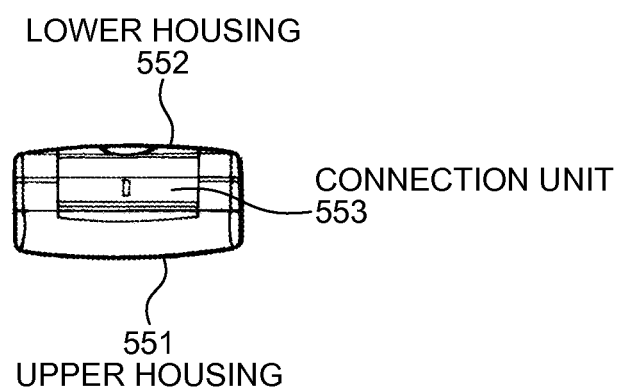
FIG. 34 is a diagram illustrating an example of an electronic apparatus to which the display device with a touch detection function according to the embodiments is applied.
Figure 35:
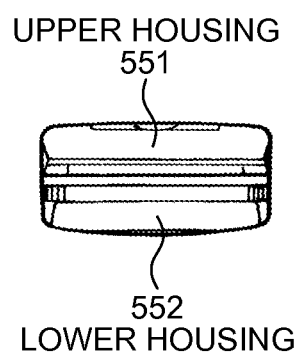
FIG. 35 is a diagram illustrating an example of an electronic apparatus to which the display device with a touch detection function according to the embodiments is applied.

The electronic apparatus illustrated in FIG. 28 is a notebook type personal computer to which the display device with a touch detection function 1 according to the first, the second, the third, or the fourth embodiment, or the modification thereof is applied. This notebook type personal computer includes, for example, a body 541, a keyboard 542 for input operation of characters, etc., and a display unit 543 that displays images. The display unit 543 is the display device with a touch detection function according to the first, the second, the third, or the fourth embodiment, or the modification thereof.

Application Example 5

The electronic apparatus illustrated in FIGS. 29 to 35 is a mobile phone to which the display device with a touch detection function 1 according to the first, the second, the third, or the fourth embodiment, or the modification thereof is applied. This mobile phone is, for example, composed of an upper housing 551 and a lower housing 552 connected to each other by a connection unit (hinge unit) 553, and includes a display 554, a subdisplay 555, a picture light 556, and a camera 557. The display 554 or the subdisplay 555 is the display device with a touch detection function according to the first, the second, the third, or the fourth embodiment, or the modification thereof.

3. CONFIGURATIONS OF PRESENT DISCLOSURE

The present disclosure includes the following aspects:
(1) A display device with a touch detection function comprising:
a substrate;
a plurality of pixel electrodes that are arranged in rows and columns in a plane parallel to the substrate;
a plurality of signal lines that extend in a plane parallel to a surface of the substrate, and supply pixel signals for displaying an image on the plurality of pixel electrodes;
a display function layer that exerts an image display function based on the pixel signals;
a plurality of drive electrodes that face the plurality of pixel electrodes in an orthogonal direction to the surface of the substrate, and extend in a direction parallel to the direction in which the plurality of signal lines extend;
a plurality of touch detection electrodes that face the plurality of drive electrodes in the orthogonal direction, extend in a direction different from the direction in which the plurality of signal lines extend, and capacitively couple with the plurality of drive electrodes; and
a scan driving unit that scans the plurality of drive electrodes, and applies thereto a touch drive signal for touch detection, wherein
the scan driving unit applies the touch drive signal to a signal line that faces, in an overlapping manner in the orthogonal direction, a drive electrode to which the touch drive signal is applied.
(2) The display device with a touch detection function according to (1), wherein
in a display operation period, the scan driving unit applies a display drive signal for display to the plurality of drive electrodes, and supplies the pixel signals for displaying the image on the plurality of pixel electrodes to the plurality of signal lines; and
in a touch detection operation period, the scan driving unit applies the touch drive signal to the drive electrodes, and applies the touch drive signal to the signal line.
(3) The display device with a touch detection function according to (1), further comprising:
a color filter that faces the display function layer in the orthogonal direction, and is colored into different regions of a red region, a green region, and a blue region corresponding to the plurality of pixel electrodes, wherein
each of the red region, the green region, and the blue region of the color filter extends in a direction coinciding with the direction in which the plurality of signal lines extend; and
the plurality of drive electrodes extend in parallel with each other for each pixel consisting of a set of the red region, the green region, and the blue region of the color filter.
(4) The display device with a touch detection function according to (3), wherein the plurality of drive electrodes are arranged such that a gap between the adjacent drive electrodes overlaps a gap between the red region and the blue region of the color filter when viewed in the orthogonal direction.

(5) The display device with a touch detection function according to (4), wherein the red region and the blue region of the color filter are arranged with the green region interposed therebetween, and a width of each of the red region and the blue region in a direction orthogonal to the extending direction thereof is smaller than a width of the green region of the color filter in a direction orthogonal to the extending direction thereof.

(6) The display device with a touch detection function according to (2), further comprising:

a plurality of metal auxiliary wirings that extend in the direction parallel to the direction in which the plurality of signal lines extend, and that are arranged for respective gaps between the adjacent drive electrodes, each of the plurality of metal auxiliary wirings being arranged between a corresponding gap among the gaps and a corresponding signal line among the plurality of signal lines when viewed in the orthogonal direction, wherein the scan driving unit applies the touch drive signal to a metal auxiliary wiring facing, in the orthogonal direction, the signal line to which the touch drive signal is applied, among the plurality of metal auxiliary wirings.

(7) The display device with a touch detection function according to (2), further comprising a plurality of metal auxiliary wirings that extend in the direction parallel to the direction in which the plurality of signal lines extend, and that are respectively stacked on the plurality of drive electrodes of transparent conductive material, each of the plurality of metal auxiliary wirings being arranged in a position facing a corresponding signal line among the plurality of signal lines when viewed in the orthogonal direction.

(8) The display device with a touch detection function according to (1), wherein the plurality of touch detection electrodes use a change in electrostatic capacitance based on proximity or contact of an external proximity object to detect the external proximity object.

(9) An electronic apparatus comprising a display device with a touch detection function capable of detecting an external proximity object, the display device with a touch detection function comprising:

a substrate;

a plurality of pixel electrodes that are arranged in rows and columns in a plane parallel to the substrate;

a plurality of signal lines that extend in a plane parallel to a surface of the substrate, and supply pixel signals for displaying an image on the plurality of pixel electrodes;

a display function layer that exerts an image display function based on the pixel signals;

a plurality of drive electrodes that face the plurality of pixel electrodes in an orthogonal direction to the surface of the substrate, and extend in a direction parallel to the direction in which the signal lines extend;

a plurality of touch detection electrodes that face the plurality of drive electrodes in the orthogonal direction, extend in a direction different from the direction in which the plurality of signal lines extend, and capacitively couple with the plurality of drive electrodes; and a scan driving unit that scans the plurality of drive electrodes, and applies thereto a touch drive signal for touch detection, wherein the scan driving unit applies the touch drive signal for touch detection to a signal line that faces, in an overlapping manner in the orthogonal direction, a drive electrode to which the touch drive signal is applied.

An electronic apparatus of the present disclosure includes the above-described display device with a touch detection function, and corresponds to, but are not limited to, for example, a television device, a digital camera, a personal computer, a video camera, or a portable electronic apparatus such as a mobile phone.

According to one aspect of the present disclosure, the display device and the electronic apparatus with a touch detection function of the present disclosure can reduce the parasitic capacitance between the drive electrode and the signal line, and thus can suppress the influence thereof on the charge and discharge of the drive electrode. This allows the display device and the electronic apparatus with a touch detection function of the present disclosure to suppress the power consumption of the touch detection. This also allows the display device and the electronic apparatus with a touch detection function of the present disclosure to increase the frequency of the drive signal fed to the drive electrode.

According to one aspect of the present disclosure, the display device and an electronic apparatus with a touch detection function of the present disclosure can be reduced in thickness, increased in screen size, or increased in definition.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function comprising:

a substrate;

a plurality of pixel electrodes that are arranged in rows and columns in a plane parallel to the substrate;

a plurality of signal lines that extend in a plane parallel to a surface of the substrate, and supply pixel signals for displaying an image on the plurality of pixel electrodes;

a display function layer that exerts an image display function based on the pixel signals;

a plurality of drive electrodes that face the plurality of pixel electrodes in an orthogonal direction to the surface of the substrate, and extend in a direction parallel to the direction in which the plurality of signal lines extend;

a plurality of touch detection electrodes that face the plurality of drive electrodes in the orthogonal direction, extend in a direction different from the direction in which the plurality of signal lines extend, and capacitively couple with the plurality of drive electrodes; and a scan driving unit that scans the plurality of drive electrodes, and applies thereto a touch drive signal for touch detection, wherein the scan driving unit applies the touch drive signal to a signal line that faces, in an overlapping manner in the orthogonal direction, a drive electrode to which the touch drive signal is applied.

2. The display device with a touch detection function according to claim 1, wherein in a display operation period, the scan driving unit applies a display drive signal for display to the plurality of drive electrodes, and supplies the pixel signals for displaying the image on the plurality of pixel electrodes to the plurality of signal lines; and in a touch detection operation period, the scan driving unit applies the touch drive signal to the drive electrodes, and applies the touch drive signal to the signal line.

3. The display device with a touch detection function according to claim 2, further comprising:
  a plurality of metal auxiliary wirings that extend in the direction parallel to the direction in which the plurality of signal lines extend, and that are arranged for respective gaps between the adjacent drive electrodes, each of the plurality of metal auxiliary wirings being arranged between a corresponding gap among the gaps and a corresponding signal line among the plurality of signal lines when viewed in the orthogonal direction, wherein
  the scan driving unit applies the touch drive signal to a metal auxiliary wiring facing, in the orthogonal direction, the signal line to which the touch drive signal is applied, among the plurality of metal auxiliary wirings.

4. The display device with a touch detection function according to claim 2, further comprising a plurality of metal auxiliary wirings that extend in the direction parallel to the direction in which the plurality of signal lines extend, and that are respectively stacked on the plurality of drive electrodes of transparent conductive material, each of the plurality of metal auxiliary wirings being arranged in a position facing a corresponding signal line among the plurality of signal lines when viewed in the orthogonal direction.

5. The display device with a touch detection function according to claim 1, further comprising:
  a color filter that faces the display function layer in the orthogonal direction, and is colored into different regions of a red region, a green region, and a blue region corresponding to the plurality of pixel electrodes, wherein
  each of the red region, the green region, and the blue region of the color filter extends in a direction coinciding with the direction in which the plurality of signal lines extend; and
  the plurality of drive electrodes extend in parallel with each other for each pixel consisting of a set of the red region, the green region, and the blue region of the color filter.

6. The display device with a touch detection function according to claim 5, wherein the plurality of drive electrodes are arranged such that a gap between the adjacent drive electrodes overlaps a gap between the red region and the blue region of the color filter when viewed in the orthogonal direction.

7. The display device with a touch detection function according to claim 6, wherein the red region and the blue region of the color filter are arranged with the green region interposed therebetween, and a width of each of the red region and the blue region in a direction orthogonal to the extending direction thereof is smaller than a width of the green region of the color filter in a direction orthogonal to the extending direction thereof.

8. The display device with a touch detection function according to claim 1, wherein the plurality of touch detection electrodes use a change in electrostatic capacitance based on proximity or contact of an external proximity object to detect the external proximity object.

9. An electronic apparatus comprising a display device with a touch detection function capable of detecting an external proximity object, the display device with a touch detection function comprising:
  a substrate;
  a plurality of pixel electrodes that are arranged in rows and columns in a plane parallel to the substrate;
  a plurality of signal lines that extend in a plane parallel to a surface of the substrate, and supply pixel signals for displaying an image on the plurality of pixel electrodes;
  a display function layer that exerts an image display function based on the pixel signals;
  a plurality of drive electrodes that face the plurality of pixel electrodes in an orthogonal direction to the surface of the substrate, and extend in a direction parallel to the direction in which the signal lines extend;
  a plurality of touch detection electrodes that face the plurality of drive electrodes in the orthogonal direction, extend in a direction different from the direction in which the plurality of signal lines extend, and capacitively couple with the plurality of drive electrodes; and
  a scan driving unit that scans the plurality of drive electrodes, and applies thereto a touch drive signal for touch detection, wherein
    the scan driving unit applies the touch drive signal for touch detection to a signal line that faces, in an overlapping manner in the orthogonal direction, a drive electrode to which the touch drive signal is applied.

* * * * *